(12) United States Patent
Lai et al.

(10) Patent No.: US 12,273,751 B2
(45) Date of Patent: Apr. 8, 2025

(54) METHODS AND APPARATUS FOR SUPPORTING COMMON DESIGN OF PDCCH SKIPPING AND SEARCH SPACE SET SWITCHING

(71) Applicant: SHARP KABUSHIKI KAISHA, Sakai (JP)

(72) Inventors: Chia-Hsin Lai, Taipei (TW); Hsin-Hsi Tsai, Taipei (TW); Hai-Han Wang, Taipei (TW); Yung-Lan Tseng, Taipei (TW)

(73) Assignee: SHARP KABUSHIKI KAISHA, Osaka (JP)

( * ) Notice: Subject to any disclaimer, the term of this patent is extended or adjusted under 35 U.S.C. 154(b) by 320 days.

(21) Appl. No.: 17/716,293

(22) Filed: Apr. 8, 2022

(65) Prior Publication Data

US 2022/0338038 A1    Oct. 20, 2022

Related U.S. Application Data

(60) Provisional application No. 63/172,558, filed on Apr. 8, 2021.

(51) Int. Cl.
*H04L 5/00*         (2006.01)
*H04W 24/08*        (2009.01)
(Continued)

(52) U.S. Cl.
CPC ........... *H04W 24/08* (2013.01); *H04L 5/0044* (2013.01); *H04W 72/0446* (2013.01); *H04W 72/23* (2023.01)

(58) Field of Classification Search
None
See application file for complete search history.

(56) References Cited

U.S. PATENT DOCUMENTS

2020/0389874 A1    12/2020  Lin et al.
2022/0312463 A1*   9/2022   Niu ................... H04W 52/0235
(Continued)

FOREIGN PATENT DOCUMENTS

EP     4236478 A1      8/2023
WO     2022086198 A1   4/2022

OTHER PUBLICATIONS

3GPP TS 38.321, "3rd Generation Partnership Project; Technical Specification Group Radio Access Network; NR; Medium Access Control (MAC) protocol specification (Release 16)", V16.6.0 (Sep. 2021).

(Continued)

*Primary Examiner* — Ajit Patel
(74) *Attorney, Agent, or Firm* — ScienBiziP, P.C.

(57) ABSTRACT

A method performed by a user equipment (UE) is provided. In the method, at least one of a first configuration associated with a first operation of switching a search space set group and a second configuration associated with a second operation of skipping a physical downlink control channel monitoring are received. Downlink control information comprising a specific field associated with at least one of the first configuration and the second configuration is also received. When the first and second configurations are received, the first operation is performed based on a value in the specific field and the first configuration when the value in the specific field is one of a first set of values, and the second operation is performed based on the value in the specific field and the second configuration when the value in the specific field is one of a second set of values.

16 Claims, 14 Drawing Sheets

(51) Int. Cl.
  *H04W 72/0446*   (2023.01)
  *H04W 72/23*     (2023.01)

(56) References Cited

U.S. PATENT DOCUMENTS

| | | | | |
|---|---|---|---|---|
| 2023/0319845 | A1* | 10/2023 | Guo | H04L 5/0094 |
| | | | | 370/329 |
| 2023/0354364 | A1* | 11/2023 | Guo | H04W 52/0229 |
| 2024/0023130 | A1* | 1/2024 | Schober | H04W 52/0229 |
| 2024/0080767 | A1* | 3/2024 | Zhang | H04W 52/0229 |

OTHER PUBLICATIONS

3GPP TS 38.321, "3rd Generation Partnership Project; Technical Specification Group Radio Access Network; NR; Medium Access Control (MAC) protocol specification (Release 16)", V16.7.0 (Dec. 2021).

3GPP TS 38.473, "3rd Generation Partnership Project; Technical Specification Group Radio Access Network; NG-RAN; F1 application protocol (F1AP) (Release 16)", V16.6.0 (Jul. 2021).

3GPP TS 38.473, "3rd Generation Partnership Project; Technical Specification Group Radio Access Network; NG-RAN; F1 application protocol (F1AP) (Release 16)", V16.9.0 (Apr. 2022).

3GPP TS 38.212, "3rd Generation Partnership Project; Technical Specification Group Radio Access Network; NR; Multiplexing and channel coding (Release 16)", V16.2.0 (Jun. 2020).

3GPP TS 38.213, "3rd Generation Partnership Project; Technical Specification Group Radio Access Network; NR; Physical layer procedures for control (Release 16)", V16.2.0 (Jun. 2020).

3GPP TS 38.331, "3rd Generation Partnership Project; Technical Specification Group Radio Access Network; NR; Radio Resource Control (RRC) protocol specification (Release 16)", V16.1.0 (Jul. 2020).

Intel Corporation, Discussion on PDCCH monitoring reduction techniques during active time, 3GPP TSG RAN WG1 Meeting #104-E, e-Meeting, Jan. 25-Feb. 5, 2021, R1-2100664, section 2.

Vivo, Discussion on DCI-based power saving adaptation in connected mode, 3GPP TSG RAN WG1#104-e, e-Meeting, Jan. 25-Feb. 5, 2021, R1-2100455, the whole document.

Lenovo, Motorola Mobility, Enhanced DCI based power saving adaptation, 3GPP TSG RAN WG1 Meeting #104-e, e-Meeting, Jan. 25-Feb. 5, 2021, R1-2101000, the whole document.

CMCC: "Discussion on PDCCH monitoring reduction during DRX active time", R1-2101054, 3GPP TSG RAN WG1 #104-e, e-Meeting, Jan. 25-Feb. 5, 2021 (Jan. 18, 2021).

* cited by examiner

METHODS AND APPARATUS FOR SUPPORTING COMMON DESIGN OF PDCCH SKIPPING AND SEARCH SPACE SET SWITCHING

CROSS-REFERENCE TO RELATED APPLICATION

The present application claims the benefit of and priority to U.S. Provisional Patent Application Ser. No. 63/172,558, filed on Apr. 8, 2021, entitled "METHOD AND APPARATUS TO SUPPORT COMMON DESIGN FOR PDCCH SKIPPING AND SEARCH SPACE SET SWITCHING," the content of which is hereby fully incorporated herein by reference for all purposes.

FIELD

The present disclosure generally relates to wireless communications, and more specifically to methods for supporting common design of physical downlink control channel (PDCCH) skipping and search space set group switching, and to user equipment (UE) configured to use such methods.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for next-generation wireless communication systems.

SUMMARY

The present disclosure is directed to a method for supporting common design of physical downlink control channel (PDCCH) skipping and search space set group (SSSG) switching, and to user equipment (UE) configured to use the method.

In a first aspect of the present disclosure, a method performed by a UE is provided. The method includes: receiving at least one of a first configuration associated with a first operation of switching a search space set group (SSSG) and a second configuration associated with a second operation of skipping a physical downlink control channel (PDCCH) monitoring; and receiving downlink control information (DCI) comprising a specific field associated with at least one of the first configuration and the second configuration. In a case that the first configuration and the second configuration are received, the method further includes: performing the first operation based on a value in the specific field and the first configuration in a case that the value in the specific field is one of a first set of values, and performing the second operation based on the value in the specific field and the second configuration in a case that the value in the specific field is one of a second set of values.

In an implementation of the first aspect, the specific field is a 2-bit field and the value in the specific field is one of 00, 01, 10 and 11.

In another implementation of the first aspect, the first set of values comprises 00 and 01, and the second set of values comprises 10 and 11.

In another implementation of the first aspect, a first part of the specific field includes first information indicating at least one of the first operation and the second operation, and a second part of the specific field includes second information indicating an SSSG index or a PDCCH skipping duration.

In another implementation of the first aspect, a first sub-value in the first part of the specific field indicates the first operation and a second sub-value in the first part of the specific field indicates the second operation.

In another implementation of the first aspect, in a case that the first information indicates the first operation, a first sub-value in the second part of the specific field indicates a first SSSG index and a second sub-value in the second part of the specific field indicates a second SSSG index, and in a case that the first information indicates the second operation, the first sub-value in the second part of the specific field indicates a first PDCCH skipping duration and the second sub-value in the second part of the specific field indicates a second PDCCH skipping duration.

In another implementation of the first aspect, the first part of the specific field comprises a most significant bit of the specific field, and the second part of the specific field comprises a least significant bit of the specific field.

In another implementation of the first aspect, the DCI comprises one of a DCI format 0_1, a DCI format 0_2, a DCI format 1_1, and a DCI format 1_2.

In another implementation of the first aspect, the method further includes: in a case that the value in the specific field is 00, performing the first operation with a first SSSG index, in a case that the value in the specific field is 01, performing the first operation with a second SSSG index, in a case that the value in the specific field is 10, performing the second operation with a first PDCCH skipping duration, and in a case that the value in the specific field is 11, performing the second operation with a second PDCCH skipping duration.

In a second aspect of the present disclosure, a UE is provided. The UE includes processing circuitry, a transceiver coupled to the processing circuitry and a memory coupled to the processing circuitry. The memory stores at least one computer-executable instructions that, when executed by the processing circuitry, causes the UE to receive, using the transceiver, at least one of a first configuration associated with a first operation of switching a search space set group (SSSG) and a second configuration associated with a second operation of skipping a physical downlink control channel (PDCCH) monitoring; and receive, using the transceiver, downlink control information (DCI) comprising a specific field associated with at least one of the first configuration and the second configuration. In a case that the first configuration and the second configuration are received, the UE is further caused to perform the first operation based on a value in the specific field and the first configuration in a case that the value in the specific field is one of a first set of values, and perform the second operation based on the value in the specific field and the second configuration in a case that the value in the specific field is one of a second set of values.

In an implementation of the second aspect, the specific field is a 2-bit field and the value in the specific field is one of 00, 01, 10 and 11.

In another implementation of the second aspect, the first set of values comprises 00 and 01, and the second set of values comprises 10 and 11.

In another implementation of the second aspect, a first part of the specific field includes first information indicating at least one of the first operation and the second operation, and a second part of the specific field includes second information indicating an SSSG index or a PDCCH skipping duration.

In another implementation of the second aspect, a first sub-value in the first part of the specific field indicates the first operation and a second sub-value in the first part of the specific field indicates the second operation.

In another implementation of the second aspect, in a case that the first information indicates the first operation, a first sub-value in the second part of the specific field indicates a first SSSG index and a second sub-value in the second part of the specific field indicates a second SSSG index, and in a case that the first information indicates the second operation, the first sub-value in the second part of the specific field indicates a first PDCCH skipping duration and the second sub-value in the second part of the specific field indicates a second PDCCH skipping duration.

In another implementation of the second aspect, the first part of the specific field comprises a most significant bit of the specific field, and the second part of the specific field comprises a least significant bit of the specific field.

In another implementation of the second aspect, the DCI comprises one of a DCI format 0_1, a DCI format 0_2, a DCI format 1_1, and a DCI format 1_2.

In another implementation of the second aspect, the computer-executable instructions, when executed by the processing circuitry, further cause the UE to: in a case that the value in the specific field is 00, perform the first operation with a first SSSG index, in a case that the value in the specific field is 01, perform the first operation with a second SSSG index, in a case that the value in the specific field is 10, perform the second operation with a first PDCCH skipping duration, and in a case that the value in the specific field is 11, perform the second operation with a second PDCCH skipping duration.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
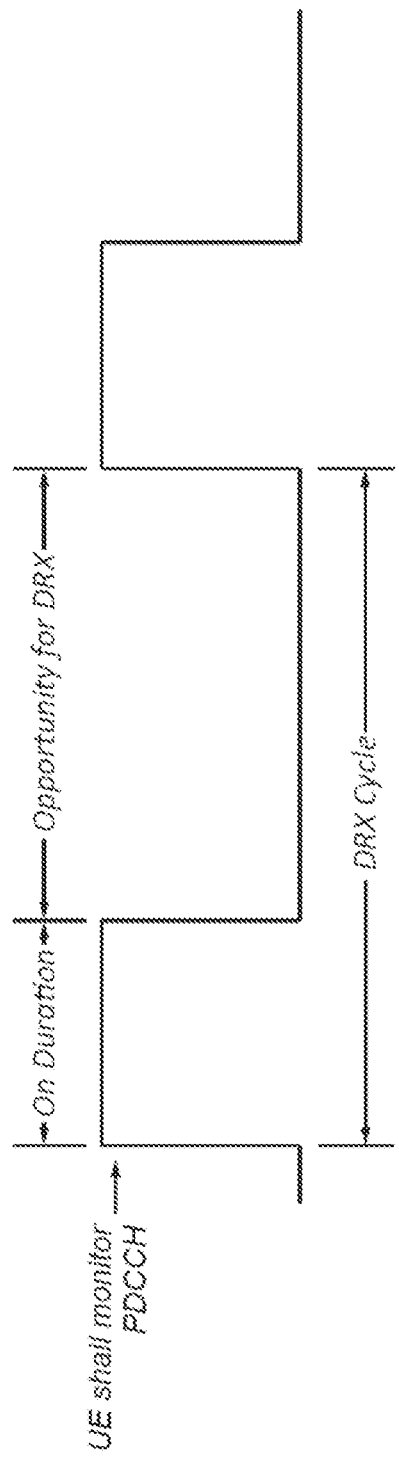
FIG. 1 is a timing diagram illustrating a discontinuous reception (DRX) cycle according to an example implementation of the present disclosure.

The terms mentioned in the present disclosure are defined as follows. Unless otherwise specified, the terms in the present disclosure have the following meanings.

| Abbreviation | Full name |
| --- | --- |
| BA | Bandwidth Adaptation |
| BSR | Buffer Status Report |
| BWP | Bandwidth Part |
| CA | Carrier Aggregation |
| CCCH | Common Control Channel |
| CE | Control Element |
| CH | Channel |
| CORESET | Control Resource Set |
| CSI | Channel State Information |
| CSS | Common Search Space |
| DCI | Downlink Control Information |
| DCP | DCI with CRC scrambled by PS-RNTI |
| DL | Downlink |
| DRX | Discontinuous Reception |
| ID | Identification |
| LBT | Listen Before Talk |
| LSB | Least Significant Bit |
| MAC | Medium Access Control |
| MCG | Master Cell Group |
| MIMO | Multi-In Multi-Out |
| MSB | Most Significant Bit |
| NR-U | New Radio Unlicensed |
| NW | Network |
| PDCCH | Physical Downlink Control Channel |
| PDSCH | Physical Downlink Shared Channel |
| PHR | Power Headroom Report |
| PUCCH | Physical Uplink Control Channel |
| PUSCH | Physical Uplink Shared Channel |
| RAR | Random Access Response |
| Rel | Release |
| RRC | Radio Resource Control |
| RRM | Radio Resource Management |
| SCS | Subcarrier Spacing |
| SL | Sidelink |
| SPS | Semi-Persistent Scheduling |
| SR | Scheduling Request |
| SS | Search Space |
| SSSG | Search Space Set Group |
| UE | User Equipment |
| UL | Uplink |
| USS | UE-specific search space |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the example implementations disclosed are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced L (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

A UE power saving working item document has been agreed to in RAN #86, in which the scope of power saving is given as follows:

(1) Enhancements for UE power saving in idle/inactive mode are specified by considering various system performance aspects.
  (a) Several paging enhancements are studied and specified to reduce unnecessary UE paging receptions, subject to no impact to legacy UEs.
  (b) Several means to provide potential tracking reference signal (TRS)/channel-state information reference signal (CSI-RS) occasion(s) available in connected mode to idle/inactive mode UEs are specified, minimizing system overhead impact. Note that always-on TRS/CSI-RS transmission by gNodeB is not required.

(2) Enhancements on power saving techniques for connected-mode UE are studied and specified, subject to minimized system performance impact.
  (a) Extensions to Rel-16 DCI-based power saving adaptation during DRX Active Time for an active BWP are studied and specified, including PDCCH monitoring reduction when connected DRX (C-DRX) is configured.
  (b) Feasibility and performance impact of relaxing UE measurements for radio link monitoring (RLM) and/or beam failure detection (BFD) are studied, particularly for low mobility UE with short DRX periodicity/cycle. In addition, relaxations in the corresponding requirements are specified.

In the following description, scope (2)(a) above is discussed, which may reduce PDCCH monitoring efforts in connected mode.

The PDCCH monitoring activity of a UE in RRC connected mode may be governed by DRX, BA, and DCP, etc.

FIG. 1 is a timing diagram illustrating a DRX cycle according to an example implementation of the present disclosure.

Referring to FIG. 1, when DRX is configured in a UE, the UE does not have to continuously monitor PDCCH(s). Specifically, a DRX cycle includes an On Duration and an Opportunity for DRX. The UE monitors PDCCH(s) during On Duration but not monitor PDCCH(s) during Opportunity for DRX. DRX is characterized by the following:

DRX on-duration: a duration (e.g., On Duration) that the UE waits for, after waking up, to receive PDCCH(s). If the UE successfully decodes a PDCCH, the UE stays awake and starts the inactivity timer.

DRX inactivity-timer: a duration that the UE waits to successfully decode a PDCCH, from the last successful decoding of a PDCCH, failing which it can go back to sleep. The UE may restart the inactivity timer following a single successful decoding of a PDCCH for a new transmission (e.g., not for retransmissions).

DRX retransmission-timer: a duration of waiting for an expected retransmission.

DRX cycle: a cycle (e.g., DRX cycle) specifies the periodic repetition of the on-duration followed by a possible period of inactivity.

DRX active time: a total duration that the UE monitors PDCCH(s). This includes the "on-duration" of the DRX cycle, the time when the UE is performing continuous reception while the inactivity timer has not expired, and the time when the UE is performing continuous reception while waiting for a retransmission opportunity.

When BA is configured in a UE, the UE only monitors PDCCH(s) on one active BWP. That is, the UE does not have to monitor PDCCH(s) on the entire DL frequency of the cell. A BWP inactivity timer (independent from the DRX inactivity-timer described above) is used to switch the active BWP to a default one when the BWP inactivity timer expires. Moreover, the BWP inactivity timer is restarted upon a successful PDCCH decoding.

In addition, the UE may be indicated by a DCP monitored on the active BWP, when configured accordingly, whether it is required to monitor PDCCH(s) or not during the next occurrence of the DRX on-duration. If the UE does not detect a DCP on the active BWP, it does not monitor PDCCH(s) during the next occurrence of the DRX on-duration unless it is explicitly configured (by other means) to do so in that case. A UE may be configured to monitor the DCP when a connected mode DRX is configured, and on the occasions at a configured offset before the DRX on-duration. More than one monitoring occasion can be configured before the DRX on-duration. The UE does not monitor DCP on the occasions occurring during DRX active time, measurement gaps, or BWP switching, in which cases it monitors PDCCH(s) during the next on-duration. If no DCP is configured in the active BWP, the UE follows normal DRX operation. When CA is configured, the DCP is only configured on the PCell. One DCP can be configured to control PDCCH monitoring during DRX on-duration for one or more UEs independently.

Power saving in the RRC_IDLE state and the RRC_INACTIVE state may be achieved by UE relaxing neighbor cells' radio resource management (RRM) measurements when it meets the criteria determining that it is in low mobility and/or not at a cell edge. The UE power saving may be enabled by adapting the DL maximum number of multi-in multi-out (MIMO) layers by BWP switching. The UE power saving is also enabled during active-time via cross-slot scheduling, which facilitates the UE achieving power saving with the assumption that it won't be scheduled to receive PDSCH, triggered to receive Aperiodic CSI (A-CSI), or transmit a PUSCH scheduled by the PDCCH until the minimum scheduling offsets K0 and K2. Dynamic adaptation of the minimum scheduling offsets K0 and K2 is controlled by the PDCCH.

In Rel-16 NR-U, a search space (SS) set group (SSSG) switching feature was introduced, by which a UE may be configured to switch between sparse and frequent PDCCH monitoring. There are at least two switching mechanisms for SSSG switching. For example, the SSSG may be switched at least by an explicit indication, by an implicit indication, and by a timer.

Figure 2A:
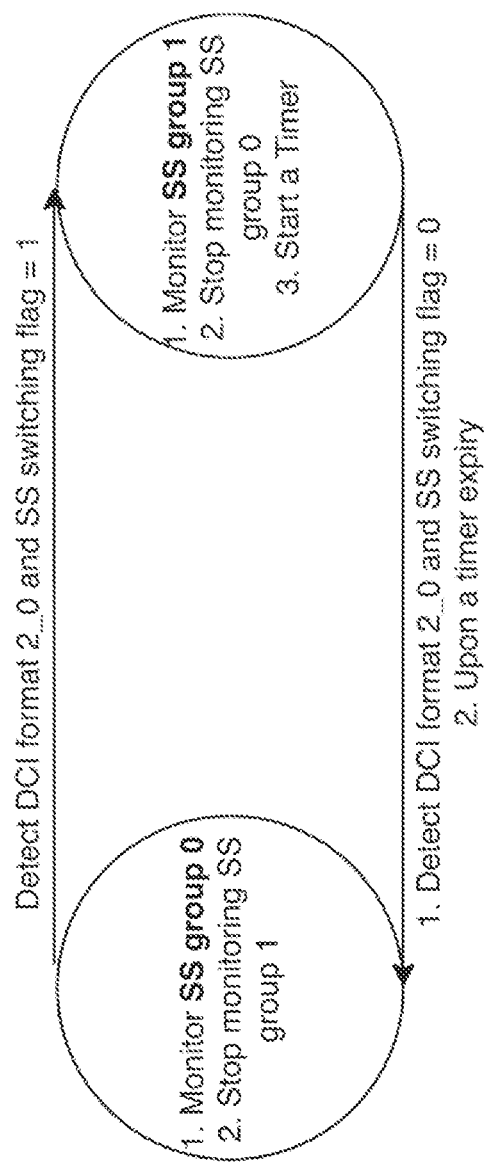
FIG. 2A and FIG. 2B are state diagrams illustrating switching mechanisms for a search space set group (SSSG) according to an example implementation of the present disclosure.
Figure 2B:
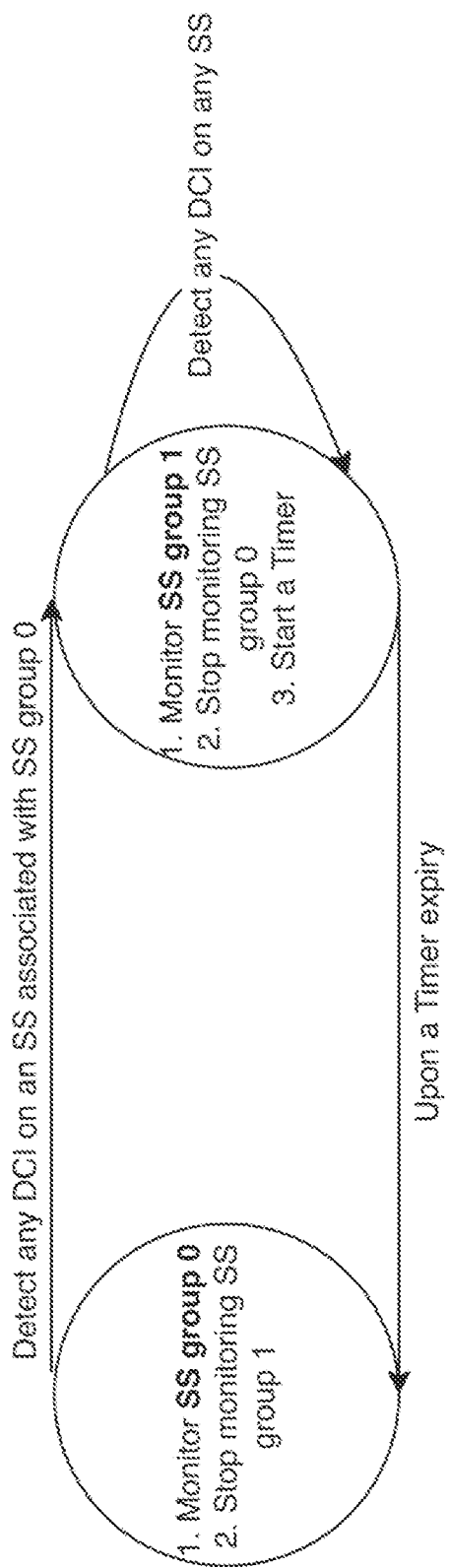

FIG. 2A and FIG. 2B are state diagrams illustrating switching mechanisms for SSSG according to example implementations of the present disclosure.

Referring to FIG. 2A, an explicit SS switching between two SSSGs is done through detection of DCI format 2_0. For example, the UE may be configured with an RRC parameter searchSpaceSwitchTrigger-r16, and each SearchSpaceSwitchingTrigger object provides a position in DCI format 2_0 of a bit field indicating an SS switching flag for a serving cell or, if CellGroupsForSwitching-r16 is configured, group of serving cells. The bit value zero (i.e., 0) of the SS switching flag indicates a first SS group (e.g., SS group 0) to be monitored and the bit value one (i.e., 1) of the SS switching flag indicates a second SS group (e.g., SS group 1) to be monitored. For example, the first SS group (e.g., SS group 0) may have less PDCCH monitor occasions, or may have more sparse search space sets than the second SS group (e.g., SS group 1), therefore monitoring the second SS group (e.g., SS group 1) consumes more power than monitoring the first SS group (e.g., SS group 0).

For example, a UE is configured with an RRC parameter searchSpaceSwitchTrigger-r16. In a case that the UE monitoring the first SS group (e.g., SS group 0) detects a DCI format 2_0 with the SS switching flag having a bit value of 1, the UE may stop monitoring the first SS group (e.g., SS group 0) and switch to monitor the second SS group (e.g., SS group 1); and in a case that the UE monitoring the second SS group (e.g., SS group 1) detects a DCI format 2_0 with the SS switching flag having a bit value of 0, the UE may stop monitoring the second SS group (e.g., SS group 1) and switch to monitor the first SS group (e.g., SS group 0). Note that more details of the explicit SS switching may be found in 3GPP TS 38.331.

Referring to FIG. 2B, an implicit SS switching happens when the UE is not configured with the RRC parameter searchSpaceSwitchTrigger-r16. The implicit SS switching may be achieved via any DCI not being limited to DCI format 2_0.

For example, a UE is not configured with an RRC parameter searchSpaceSwitchTrigger-r16. In a case that the UE monitoring the first SS group (e.g., SS group 0) detects any DCI on an SS associated with the first SS group (e.g., SS group 0), the UE may stop monitoring the first SS group (e.g., SS group 0) and switch to monitor the second SS group (e.g., SS group 1). In some embodiments, in a case that the UE monitoring the second SS group (e.g., SS group 1) detects any DCI on any SS, the UE may keep monitoring the second SS group (e.g., SS group 1) without switching back to the first SS group (e.g., SS group 0). Note that more details of the implicit SS switching may be found in 3GPP TS 38.331.

Referring to FIG. 2A and FIG. 2B, a timer-based SS switching may be achieved by configuring a specific timer. Specifically, a timer (e.g., searchSpaceSwitchingTimer) may be configured for SS switching. For example, the UE may (re-)start the timer when the UE detects the DCI format 2_0 with the SS switching flag set to 1, detects any DCI on an SS associated with SS group 0, and/or detects any DCI on any SS. Upon the timer expiry, the UE may stop monitoring the second SS group (e.g., SS group 1) and switch to monitor the first SS group (e.g., SS group 0). It is noted that the timer-based SS switching may be applied to both the explicit SS switching and the implicit SS switching. It is further noted that more details of the timer-based SS switching may be found in 3GPP TS 38.331.

In NR, basically the monitoringSlotPeriodicityAndOffset and duration in SearchSpace decide the slots where the PDCCH is monitored. Then monitoringSymbolsWithinSlot in SearchSpace and duration in ControlResourceSet determine the PDCCH monitoring occasion pattern within a slot.

Figure 3:
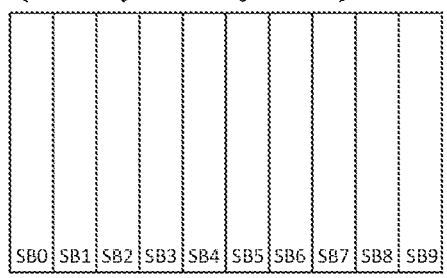
FIG. 3 is a timing diagram illustrating physical downlink control channel (PDCCH) monitoring occasions according to an example implementation of the present disclosure.
Figure 3:
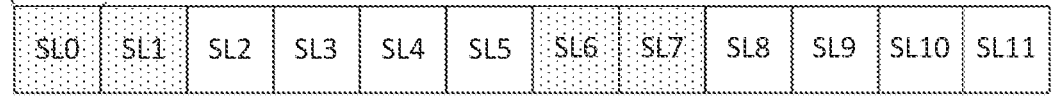

FIG. 3 is a timing diagram illustrating PDCCH monitoring occasions according to an example implementation of the present disclosure.

Referring to FIG. 3, monitoringSlotPeriodicityAndOffiet indicates a periodicity of 6 and an offset of 0, and duration in SearchSpace is set to 2. Therefore, the PDCCH is monitored in slots SL0, SL1, SL6 and SL7. In addition, monitoringSymbolsWithinSlot is set to "1000010000", and duration in ControlResourceSet is set to 3. Therefore, for each of the slots SL0, SL1, SL6 and slot SL7, the PDCCH is monitored in symbols SB0, SB1, SB2, SB5, SB6 and SB7.

Figure 4:
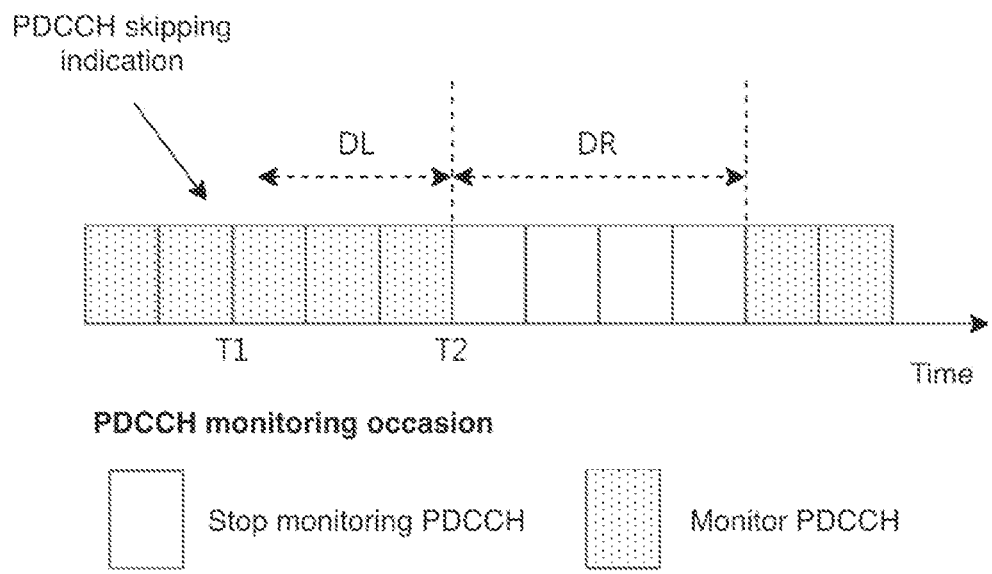
FIG. 4 is a timing diagram illustrating a PDCCH skipping scheme according to an example implementation of the present disclosure.

FIG. 4 is a timing diagram illustrating a PDCCH skipping scheme according to an example implementation of the present disclosure.

Referring to FIG. 4, the UE may receive a PDCCH skipping indication (contained in a specific DCI format) from the network (NW), for example, at the time point T1. The PDCCH skipping indication may be used to indicate a duration DR that the UE may stop monitoring the PDCCH(s). The UE may start to apply PDCCH skipping (i.e., stop monitoring the PDCCH(s)) at the time point T2 after a time period of application delay DL from the time point T1 at which the UE receives the PDCCH skipping indication. After the duration DR for stopping the monitoring of the PDCCH, the UE may restart monitoring the PDCCH(s) as usual (e.g., when the UE is in DRX active time). In some implementations, the UE may be preconfigured with one or more durations by the NW via the higher layer parameter(s) (e.g., RRC configuration), and the PDCCH skipping indication may indicate which duration should be applied for the PDCCH skipping (i.e., for stopping the monitoring of the PDCCH). In the present disclosure, the duration DR that the UE stops monitoring the PDCCH(s) may be referred to as a PDCCH skipping duration.

Rel-16 introduced a new physical layer signaling scheme which could be used to further control the PDCCH monitoring behavior for the DRX on-duration based on the configured DRX mechanism, which means the NW could send the new physical layer signaling to the UE to ask it to wake up within DRX on-duration or not. The new physical layer signaling is called DCI with CRC scrambled by PS-RNTI (DCP).

Figure 5:
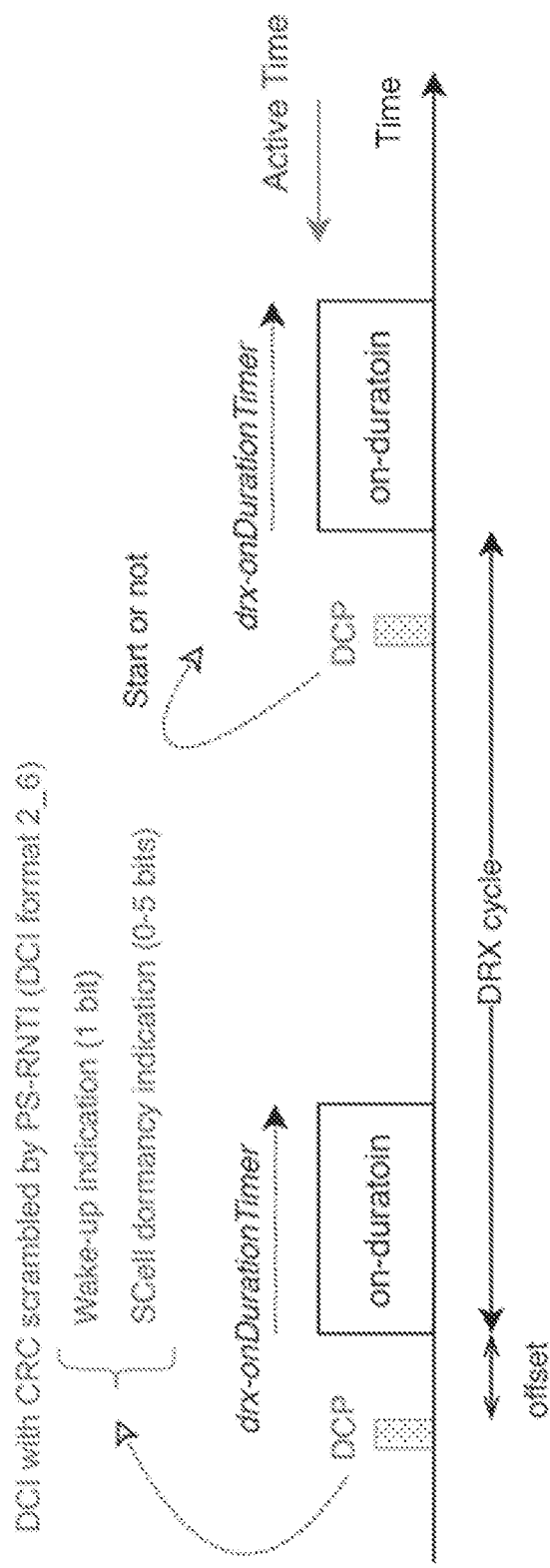
FIG. 5 is a timing diagram illustrating a downlink control information (DCI) with cyclic redundancy check (CRC) scrambled by power saving-radio network temporary identifier (PS-RNTI) (DCP) mechanism according to an example implementation of the present disclosure.

FIG. 5 is a timing diagram illustrating a DCP mechanism according to an example implementation of the present disclosure.

Referring to FIG. 5, a DCP is indicated by DCI format 2_6, which is used for notifying the power saving information outside DRX active time for one or more UEs. The DCI format 2_6 includes two indications. One of the two indications is a "Wake-up indication" (1 bit), and another one of the two indications is a "Dormancy indication" (0-5 bits). The "Wake-up indication" is used to control the PDCCH monitoring behavior for the DRX on-duration. Specifically, the "Wake-up indication" of the DCP indicates whether the UE is to start the drx-onDurationTimer or to stay dormant. On the other hand, the "Dormancy indication" is used to control the BWP switching (i.e., entering or leaving a dormant BWP) for a dormancy SCell group.

When it comes to BWP switching for the serving cell(s) of a dormancy group, the NW could group one or more serving cells (e.g., SCells) into a dormancy group and could configure one or more dormancy groups. The dormancy group configuration may be indicated by the IE dormancyGroupWithinActiveTime and/or dormancyGroupOutsideActiveTime (in ServingCellConfig). The IE dormancyGroupWithinActiveTime/dormancyGroupOutsideActiveTime contains the ID of a dormancy group, within active time/outside active time, to which the serving cell belongs. In addition, how many groups could be configured for a Cell Group is specified according to an IE maxNrofDormancyGroups. Upon dormancy group(s) being configured, the NW could switch the BWPs for all the serving cells in the dormancy group(s) entering/leaving a dormant BWP via signaling (e.g., DCI format 2_6, DCI format 0_1, DCI format 1_1, etc.).

According to the discussion in Rel-17 regarding power saving, a common design for DCI-based PDCCH monitoring adaptation in active time for an active BWP to support functionalities inclusive of both SSSG switching and PDCCH skipping for a duration may be determined. Moreover, functionalities inclusive of SSSG switching, PDCCH skipping for a duration, and SCell dormancy may be considered.

In some embodiments, one or more DCI fields may be added (and/or reused) to support at least one of the functionalities of SSSG switching, PDCCH skipping, and SCell dormancy. When a UE receives/decodes/detects DCI including the one or more DCI fields, the UE may perform at least one of SSSG switching, PDCCH skipping, and SCell dormancy based on the one or more DCI fields. One or more items of information or configurations related to at least one of SSSG switching, PDCCH skipping, and SCell dormancy may be configured via an RRC message. The one or more DCI fields are associated with the one or more items of information or configurations.

In some implementations, the one or more items of information or configurations in a received RRC message may imply an existence of the one or more DCI fields. In some implementations, the one or more items of information or configurations in a received RRC message may imply an existence of the one or more DCI fields as well as the field size of each DCI field.

In some implementations, the UE may perform at least one of SSSG switching, PDCCH skipping, and SCell dormancy based on one or more values in the one or more DCI fields. In some implementations, the UE may perform at least one of SSSG switching, PDCCH skipping, and SCell dormancy based on one or more values in the one or more DCI fields and the one or more items of information or configurations associated with the one or more DCI fields.

In some implementations, the one or more values in the one or more DCI fields may indicate one or more indexes of the one or more items of information or configurations relating to at least one of SSSG switching, PDCCH skipping, and SCell dormancy configured (e.g., via the received RRC message).

In some implementations, the one or more items of information or configurations configured may include a table relating to at least one of SSSG switching, PDCCH skipping, and SCell dormancy. The one or more values in the one or more DCI fields may provide a row index (e.g., m or m+1) to the table.

In some implementations, the indexed row defines the activation/deactivation (or enabling/disabling) of PDCCH skipping, and/or the activation/deactivation (or enabling/disabling) of SSSG switching, and/or the activation/deactivation (or enabling/disabling) of SCell dormancy, and/or parameter(s) for PDCCH skipping (e.g., a PDCCH skipping duration), and/or parameter(s) for SSSG switching (e.g., SSSG ID), and/or parameter(s) for SCell dormancy (e.g., SCell group ID for SCell dormancy).

In some implementations, the UE may perform at least one of SSSG switching, PDCCH skipping, and SCell dormancy based on the row index (e.g., m) in the one or more DCI fields and the table relating to at least one of SSSG switching, PDCCH skipping, and SCell dormancy.

In some implementations, the one or more DCI fields may include information or indications relating to at least one of:
activation/deactivation (or enabling/disabling) related to PDCCH skipping (for a duration), and/or
activation/deactivation (or enabling/disabling) related to SSSG switching, and/or
activation/deactivation (or enabling/disabling) related to SCell dormancy, and/or
parameter(s) related to PDCCH skipping (e.g., PDCCH skipping duration), and/or
parameter(s) related to SSSG switching (e.g., SSSG ID), and/or
parameter(s) related to SCell dormancy, (e.g., SCell group ID, and/or Cell ID in a SCell dormancy SCell group), and/or
SCell group related to PDCCH skipping, and/or
SCell group related to SSSG switching, and/or
SCell group related to SCell dormancy.

In some implementations, the parameter(s) related to PDCCH skipping may include at least one of:
PDCCH skipping duration (e.g., Tskip, in unit of milliseconds (msec), and/or slot, and/or DRX cycle, and/or symbol, and/or monitoring occasion and/or subframe), and/or
CORESET ID, and/or
SS ID, and/or
a number of symbols (e.g., Pskip, in unit of msec, and/or slot, and/or DRX cycle, and/or symbol, and/or monitoring occasion and/or subframe, and/or
offset.

Specifically, the Pskip is a delay for applying PDCCH skipping. For example, the PDCCH skipping may be applied at a first slot after at least Pskip symbols from the last symbol of the PDCCH with the DCI. For another example, the PDCCH skipping may be applied after at least Pskip symbols from the last symbol of the PDCCH with the DCI.

Specifically, the offset may be used to indicate when the UE should start performing the PDCCH skipping. For example, the offset may be used to indicate a period from receiving the DCI indication for PDCCH skipping, and/or from the beginning of the subframe/slot/DRX cycle which includes the DCI indication for PDCCH skipping.

In some implementations, parameter(s) related to SSSG switching may include at least one of:
SSSG ID, and/or
number of SSSG, and/or
SSSG switching duration (e.g., searchSpaceSwitching-Timer, which is the duration that SSSG switching may be applied), and/or
a number of symbols (e.g., Pswitch, in unit of msec, and/or slot, and/or DRX cycle, and/or symbol, and/or monitoring occasion and/or subframe, and/or offset.

Specifically, the Pswitch is a delay for applying SSSG switching. For example, the SSSG switching may be applied at a first slot after at least Pswitch symbols from the last symbol of the PDCCH with the DCI. For another example, the SSSG switching may be applied after at least Pswitch symbols from last symbol of the PDCCH with the DCI.

Specifically, the offset may be used to indicate when the UE should start performing the SSSG switching. For example, the offset may be used to indicate a period from receiving the DCI indication for SSSG switching, and/or from the beginning of the subframe/slot/DRX cycle which includes the DCI indication for PDCCH skipping.

In some implementations, the one or more DCI fields reused may include at least one of:
SCell dormancy indication field, and/or
carrier indicator field, and/or
wake-up indication, and/or
DCI field related to SSSG switching.

In some implementations, the DCI including the one or more DCI fields may be:
DCI format 0_0, and/or
DCI format 0_1, and/or
DCI format 0_2, and/or
DCI format 1_0, and/or
DCI format 1_1, and/or
DCI format 1_2, and/or
DCI format 2_0, and/or
DCI format 2_1, and/or
DCI format 2_2, and/or
DCI format 2_3, and/or
DCI format 2_4, and/or
DCI format 2_5, and/or
DCI format 2_6 (in active time, and/or outside active time), and/or
DCI format 3_0, and/or
DCI format 3_1.

In some implementations, a UE may receive/decode/detect control information (e.g., DCI) including an n-bit carrier indication field and an m-bit SCell dormancy indication field. If the value in the n-bit carrier indication field is 0, the UE may determine that the value in the m-bit SCell dormancy indication field indicates RRC parameter(s) associated with the SCell dormancy. If the value in the n-bit carrier indication field is 1, the UE may determine that the value in the m-bit SCell dormancy indication field jointly indicates RRC parameter(s) associated with the PDCCH skipping and the SSSG switching.

For example, the value x (e.g., x=001, or e.g., x=1) in the m-bit DCI field (e.g., m-bits SCell dormancy indication field) provides a row index (e.g., x or x+1) to a table corresponding to the one or more items of information or configurations relating to at least one of SSSG switching, and/or PDCCH skipping (for a duration) configured in the RRC message. Table 1 shown below provides an example of the (RRC) table corresponding to the one or more items of information or configurations related to at least one of SSSG switching, and/or PDCCH skipping for a duration. Taking the row index "1" for illustration, the row with the row index "1" defines the activation/enabling of PDCCH skipping for a duration and the activation/enabling of SSSG switching, where the PDCCH skipping duration is 6, and the SSSG ID is 1.

TABLE 1

| index | activation/ deactivation of PDCCH skipping | activation/ deactivation of SSSG switching | PDCCH skipping duration (in unit of slot, and/ or msec, symbol, subframe, and/or DRX cycle) | SSSG ID |
|---|---|---|---|---|
| 0 | 1 | 1 | 3 | 2 |
| 1 | 1 | 1 | 6 | 0 |
| 2 | 0 | 1 | 4 | 0 |
| 3 | 0 | 1 | 2 | 1 |
| 4 | 1 | 0 | 5 | 1 |
| 5 | 1 | 0 | 6 | 2 |
| 6 | 0 | 1 | 4 | 2 |
| 7 | 0 | 0 | 1 | 2 |

According to Table 1, in a case that the DCI field relating to the SSSG switching and PDCCH skipping is a 3-bit field, a first bit (e.g., MSB) indicates activation/deactivation of SSSG switching, a second bit (e.g., middle bit of the 3-bit field) indicates activation/deactivation of PDCCH skipping, and the other bit(s) (e.g., LSB) indicate(s) parameters related to the SSSG switching and the PDCCH skipping.

However, it should be noted that one skilled in the art may change the values in the table according to different designs; therefore, each bit in the DCI field may indicate different information from that in Table 1. For example, an MSB of the DCI field may be used for indicating activation/deactivation of SSSG switching and an LSB of the DCI field may be used for indicating activation/deactivation of PDCCH skipping.

In some implementations, a UE may receive/decode/detect control information (e.g., DCI) including a 1-bit DCI field indicating activation/deactivation (or enabling/disabling) of PDCCH skipping. If the value in the bit field is a first value (e.g., 0 or 1), the UE may not activate/enable, or may deactivate/disable, PDCCH skipping. If the value in the bit field is a second value (e.g., 1 or 0) different from the first value, the UE may activate/enable, or may not deactivate/disable, PDCCH skipping.

In some cases, if the UE is indicated by DCI to activate/enable the PDCCH skipping, the UE may perform the PDCCH skipping once after receiving the DCI.

In some cases, if the UE is indicated by DCI to activate/enable the PDCCH skipping (for a duration), the UE may perform the PDCCH skipping for a number of times after receiving the DCI. The number may be indicated by the DCI and/or configured by an RRC message. The number may be, for example, related to the DRX cycle.

In some cases, if the UE is indicated by DCI to activate/enable the PDCCH skipping, the UE may perform the PDCCH skipping for a period which may be determined by a timer related to the period. For example, the timer may be (re-)started upon the UE receiving the DCI to activate/enable the PDCCH skipping. While the timer is running, the UE may perform the PDCCH skipping for each DRX cycle. Upon the timer expiring, the UE stops performing the PDCCH skipping.

In some implementations, a UE may receive/decode/detect control information (e.g., DCI) including a 1-bit DCI field indicating activation/deactivation (or enabling/disabling) of SSSG switching. If the value in the bit field is a first value (e.g., 0 or 1), the UE may not activate/enable, or may deactivate/disable, SSSG switching. If the value in the bit field is a second value (e.g., 1 or 0) different from the first value, the UE may activate/enable, or may not deactivate/disable, SSSG switching.

In some cases, if the UE is indicated by DCI to activate/enable the SSSG switching, the UE may perform the SSSG switching after receiving the DCI.

In some cases, if the UE is indicated by DCI to activate/enable the SSSG switching, the UE may perform the SSSG switching for a period which may be determined by a timer related to the period. For example, the timer may be (re-)started upon the UE receiving the DCI to activate/enable the SSSG switching. While the timer is running, the UE may perform the SSSG switching. Upon the timer expiring, the UE may switch the monitored SSSG to a configured or a default SSSG. The default SSSG may, for example, be pre-configured by a DL UE-specific control signaling via one given default SSSG ID.

Accordingly, it should be known that the 1-bit field in the DCI may be used for jointly indicating activation/deactivation (or enable/disable) of PDCCH skipping and SSSG switching.

In some implementations, the 1-bit field in the DCI may indicate activation and/or deactivation of both PDCCH skipping and SSSG switching. For example, if the value in the bit field is a first value (e.g., 0 or 1), the UE may not activate/enable (or deactivate/disable) the PDCCH skipping and SSSG switching; if the value in the bit field is a second value (e.g., 1 or 0) different from the first value, the UE may activate/enable (or not deactivate/disable) the PDCCH skipping and SSSG switching.

In some implementations, the 1-bit field in the DCI may indicate activation/enabling of one of PDCCH skipping and SSSG switching and deactivation/disabling of the other of PDCCH skipping and SSSG switching. Specifically, the 1-bit field in the DCI may be used for selecting one of PDCCH skipping and SSSG switching. For example, if the value in the bit field is a first value (e.g., 0 or 1), the UE may not activate/enable (or deactivate/disable) the PDCCH skipping and activate/enable (or not deactivate/disable) the SSSG switching; if the value in the bit field is a second value (e.g., 1 or 0) different from the first value, the UE may activate/enable (or not deactivate/disable) the PDCCH skipping and not activate/enable (or deactivate/disable) SSSG switching.

In light of the foregoing descriptions, a UE may receive/decode/detect control information (e.g., DCI) including a specific n-bit field associated with a plurality of functionalities or operations (e.g., PDCCH skipping and SSSG switching). More specifically, the n-bit field may include m bits for selecting one of the plurality of functionalities or operations (e.g., one of PDCCH skipping and SSSG switching). More specifically, the n-bit field may include p (e.g., n-m) bits for indicating information or configuration(s) associated with the selected functionality or operation. For example, the information or configuration(s) associated with PDCCH skipping may include a PDCCH skipping duration, and the information or configuration(s) associated with SSSG switching may include an SSSG index (e.g., SSSG ID). In other examples, the p (e.g., n-m) bits may indicate other types of information or configuration(s).

Taking n=2 and m=1 as an example, the UE may be configured with configurations of both PDCCH skipping and SSSG switching and may receive/decode/detect DCI including a specific 2-bit field associated with the PDCCH skipping and the SSSG switching. A value of the first bit (e.g., MSB) of the specific 2-bit field may indicate one of PDCCH skipping and SSSG switching, and a value of the second bit (e.g., LSB) of the specific 2-bit field may indicate a PDCCH skipping duration in a case that the PDCCH skipping is indicated by the first bit or an SSSG ID in a case that the SSSG switching is indicated by the first bit. For example, in a case that the value of the first bit is "0", the UE may perform SSSG switching; in a case that the value of the first bit is "1", the UE may perform PDCCH skipping. Moreover, in a case that the first bit is "0" and the second bit is "0", the UE may perform the SSSG switching according to a first SSSG ID (e.g., by referring to the aforementioned table); in a case that the first bit is "0" and the second bit is "1", the UE may perform the SSSG switching according to a second SSSG ID (e.g., by referring to the aforementioned table); in a case that the first bit is "1" and the second bit is "0", the UE may perform the PDCCH skipping according to a first PDCCH skipping duration (e.g., by referring to the aforementioned table); and in a case that the first bit is "1" and the second bit is "1", the UE may perform the PDCCH skipping according to a second PDCCH skipping duration (e.g., by referring to the aforementioned table).

In some implementations, the UE may be provided with a number of symbols (e.g., Pskip symbols) as a delay for applying PDCCH skipping. The PDCCH skipping may be applied at a first slot after at least Pskip symbols from the last symbol of the PDCCH with the DCI. The PDCCH skipping duration (e.g., Tskip) is the skipping duration for the PDCCH skipping. The UE may be provided with a number of symbols (e.g., Pswitch symbols) as a delay for applying SSSG switching. The SSSG switching (e.g., to switch the monitored SSSG from SSSG1 to SSSG2) may be applied at a first slot after at least Pswitch symbols from the last symbol of the PDCCH with the DCI.

FIG. 6A to FIG. 6E are timing diagrams illustrating UE operations when different parameters are provided for PDCCH skipping and SSSG switching according to example implementations of the present disclosure.

Referring to FIG. 6A to 6E, the UE may be provided with parameters of a delay for applying PDCCH skipping (e.g., Pskip), a delay for applying SSSG switching (e.g., Pswitch), and a PDCCH skipping duration (e.g., Tskip), and both the PDCCH skipping and the SSSG switching are activated/enabled. The UE may perform the PDCCH skipping and the SSSG switching based on the parameters Pskip, Pswitch, and Tskip provided.

Figure 6A:
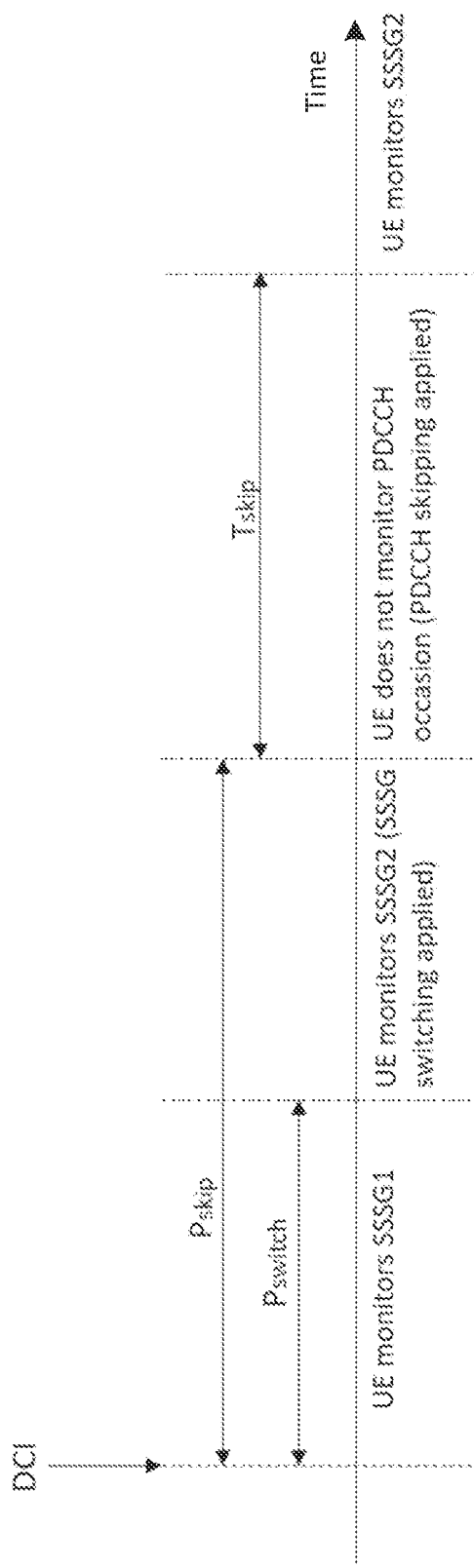
FIG. 6A to FIG. 6E are timing diagrams illustrating user equipment (UE) operations when different parameters are provided for PDCCH skipping and SSSG switching according to example implementations of the present disclosure.

Referring to FIG. 6A, in some cases, the Tskip duration starts after the UE starts applying the SSSG switching. In these cases, the UE may apply the SSSG switch first (e.g., switch the monitored SSSG from SSSG1 to SSSG2), start applying the PDCCH skipping (e.g., stop monitoring any PDCCH occasion) from the beginning of the Tskip duration, then restore to monitor the original SSSG (e.g., SSSG2), which was monitored before the UE started applying the PDCCH skipping (i.e., before the Tskip duration), from the end of the Tskip duration.

In some implementations, in a case that the UE is provided with both Pskip and Pswitch and both functionalities of the PDCCH skipping and SSSG switching are activated/enabled, the UE may apply the PDCCH skipping prior to the SSSG switching in some implementations. In some implementations, in a case that the UE is provided with both Pskip and Pswitch and both functionalities of the PDCCH skipping and SSSG switching are activated/enabled, the UE may apply the SSSG switching prior to the PDCCH skipping in some other implementations.

In some implementations, in a case that two (or more) functionalities (e.g., the PDCCH skipping and SSSG switching) are activated/enabled, the UE may apply the functionality activated/enabled later than the other functionality. In some implementations, in a case that two (or more) functionalities (e.g., the PDCCH skipping and SSSG switching) are activated/enabled, the UE may apply the functionality activated/enabled earlier than the other functionality.

Figure 6B:
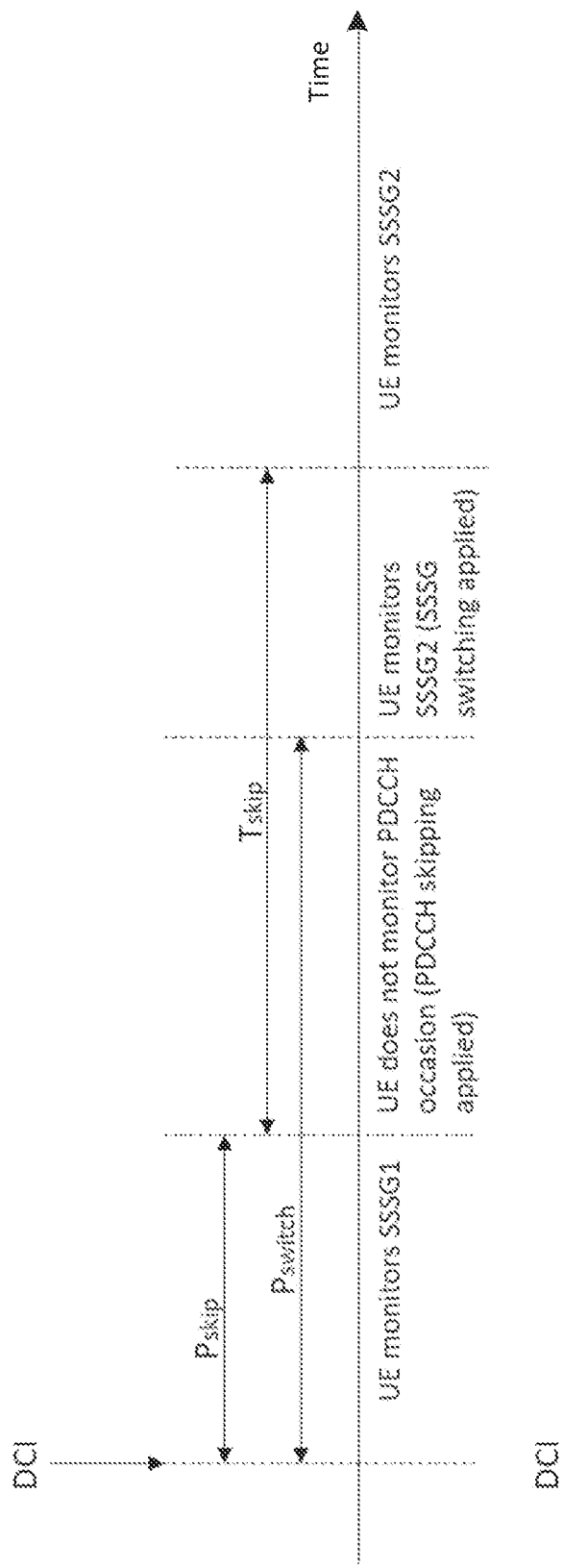
Figure 6C:
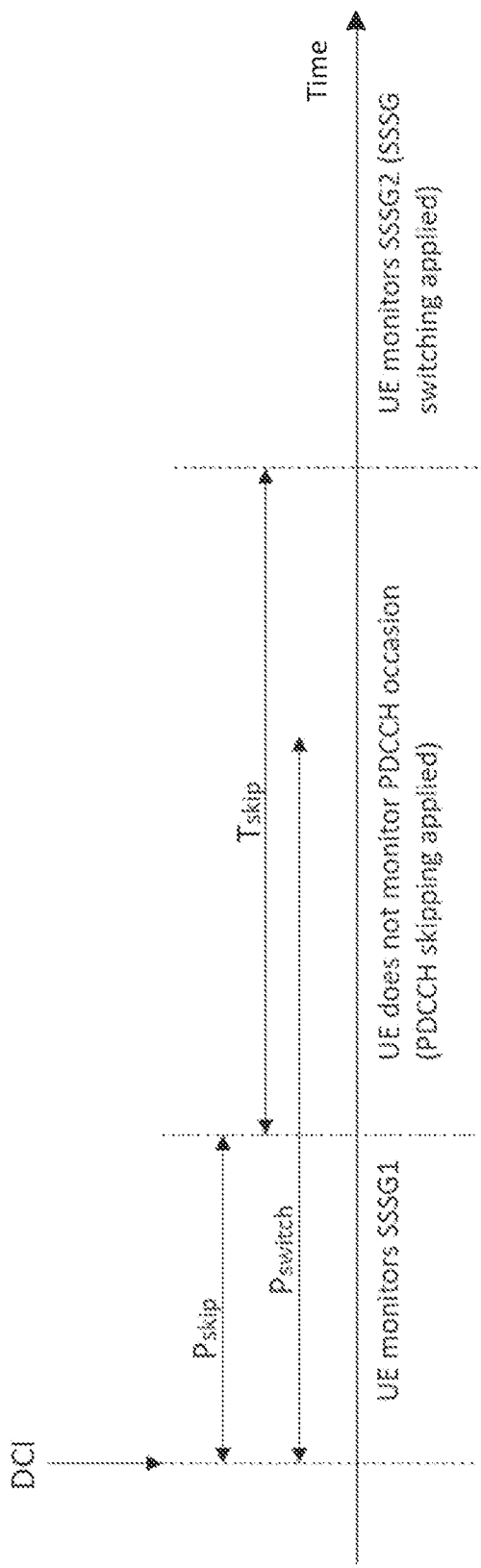

Referring to FIG. 6B and FIG. 6C, in some cases, the UE may be provided with the parameters Pskip, Pswitch, and Tskip, and the parameter Pswitch may indicate that the SSSG switching should be applied during the Tskip duration. In a case that the SSSG switching is prior to the PDCCH skipping, as shown in FIG. 6B, the UE may apply the SSSG switching at the timing indicated by the parameter Pswitch during the Tskip duration. In a case that the SSSG switching is not prior to the PDCCH skipping, as shown in FIG. 6C, the UE may apply the SSSG switching from the end of the Tskip duration.

Figure 6D:
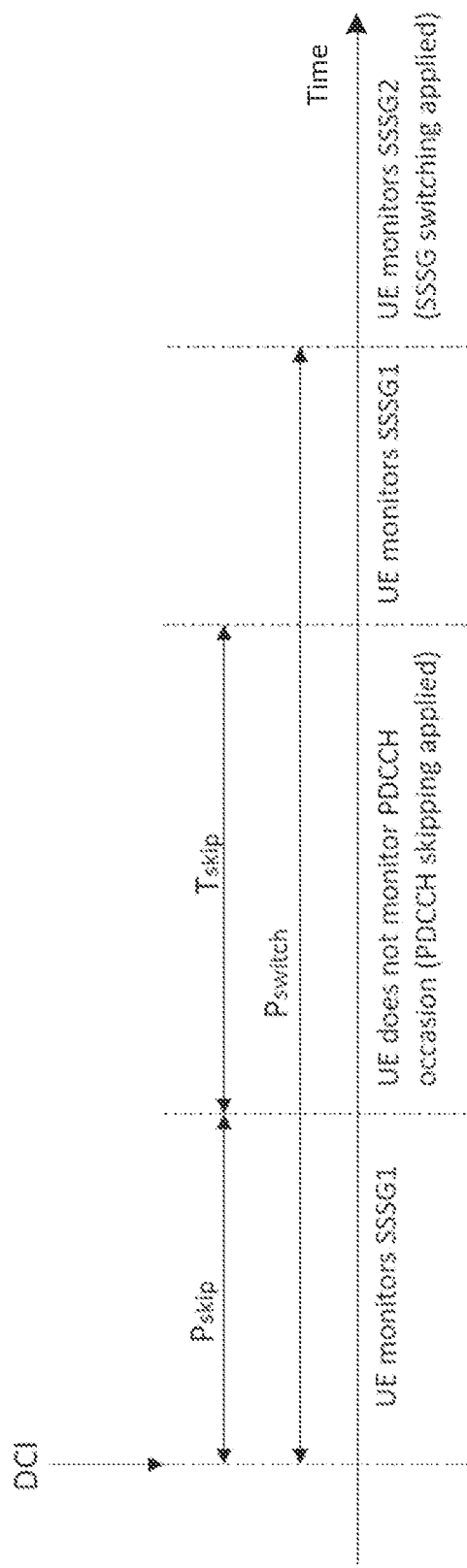
Figure 6E:
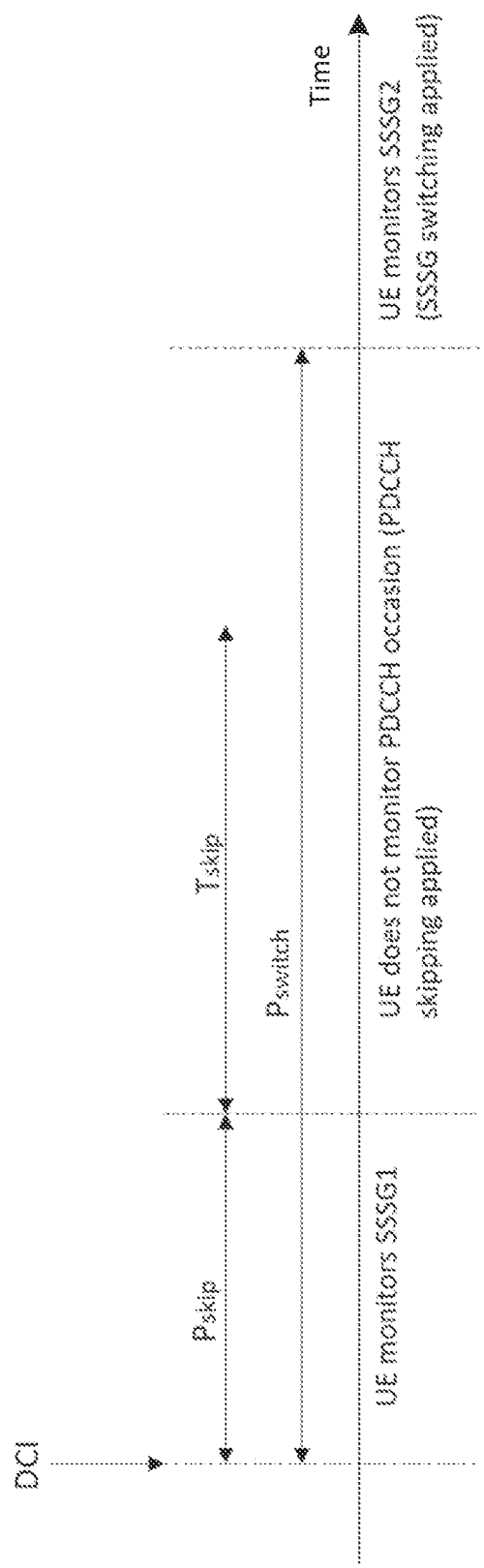

Referring to FIG. 6D and FIG. 6E, in some cases, the UE may be provided with the parameters Pskip, Pswitch, and Tskip, the Tskip duration ends before the UE starts applying the SSSG switching, and the UE may not monitor the PDCCH occasions in the Tskip duration. In a case shown in FIG. 6D, the UE may monitor the original SSSG (i.e., SSSG1), which is monitored before the UE starts applying the PDCCH skipping (i.e., before the Tskip duration), from the end of the Tskip duration until the UE starts applying the SSSG switching. In some other cases shown in FIG. 6E, the UE may not monitor the PDCCH occasions from the end of the Tskip duration until the UE starts applying the SSSG switching (i.e., the UE may continue to apply PDCCH skipping until the UE starts applying the SSSG switching).

In some implementations, a UE may receive/decode/detect a control information (e.g., DCI) including a 1-bit DCI field indicating activation and/or deactivation of PDCCH skipping and/or SSSG switching. The UE may activate/enable or deactivate/disable the PDCCH skipping and/or the SSSG switching based on information or configuration(s) configured via an RRC message. For example, the information or configuration(s) configured via the RRC message may indicate which function(s) should be controlled by the DCI. In some cases, the information or configuration(s) configured via the RRC message may indicate that only PDCCH skipping is controlled by the DCI. In some cases, the information or configuration(s) configured via the RRC message may indicate that only SSSG switching is controlled by the DCI. In some cases, the information or configuration(s) configured via the RRC message may indicate that both PDCCH skipping and SSSG switching are controlled by the DCI.

In some implementations, a UE may receive/decode/detect control information (e.g., DCI) including a 1-bit DCI field jointly indicating activation/enabling or deactivation/disabling of PDCCH skipping and SSSG switching. If the value in the bit field is a first value (e.g., 0 or 1), the UE may activate/enable the PDCCH skipping and deactivate/disable (or may not activate/enable) the SSSG switching. If the value in the bit field is a second value (e.g., 1 or 0) different from the first value, the UE may activate/enable the SSSG switching and deactivate/disable (or not activate/enable) the PDCCH skipping.

In some implementations, a UE may receive/decode/detect control information (e.g., DCI) including a 2-bit DCI field jointly indicating activation/enabling or deactivation/disabling of PDCCH skipping and SSSG switching. The most significant bit (MSB) of the DCI field may be used to indicate activation/enabling or deactivation/disabling of the PDCCH skipping. The least significant bit (LSB) of the DCI field may be used to indicate activation/enabling or deactivation/disabling of the SSSG switching.

For example, in a case that the value in the DCI field is 00, the UE may not activate/enable (or may deactivate/disable) the PDCCH skipping and the SSSG switching; in a case that the value in the DCI field is 11, the UE may activate/enable the PDCCH skipping and the SSSG switching; in a case that the value in the DCI field is 01, the UE may deactivate/disable (or may not activate/enable) the PDCCH skipping and may activate/enable the SSSG switching; and in a case that the value in the DCI field is 10, the UE may activate/enable the PDCCH skipping and may deactivate/disable (or may not activate/enable) the SSSG switching.

In another example, in a case that the value in the DCI field is 11, the UE may not activate/enable (or may deactivate/disable) the PDCCH skipping and the SSSG switching; in a case that the value in the DCI field is 00, the UE may activate/enable the PDCCH skipping and the SSSG switching; in a case that the value in the DCI field is 10, the UE may deactivate/disable (or may not activate/enable) the PDCCH skipping and may activate/enable the SSSG switching; and in a case that the value in the DCI field is 01, the UE may activate/enable the PDCCH skipping and may deactivate/disable (or may not activate/enable) the SSSG switching.

In some implementations, a UE may receive/decode/detect control information (e.g., DCI) including an n-bit (e.g., n=5) DCI field, and the value (e.g., m=00110, or m=6) in the n-bit DCI field may be used for providing a row index (e.g., m or m+1) to a table corresponding to the one or more items of information or configurations related to at least one of SSSG switching, and/or PDCCH skipping, and/or SCell dormancy configured in the received RRC message. Taking the row index "1" for illustration, the row with the row index "6" defines the deactivation of PDCCH skipping (for a duration), and/or the activation of SSSG switching, and/or the SSSG ID is 2.

In some implementations, a UE may receive/decode/detect control information (e.g., DCI) including an n-bit (e.g., n=3) DCI field, and the value m (e.g., m=001, or m=1) in the n-bit DCI field may be used for providing a row index (e.g., m or m+1) to a table corresponding to the one or more items of information or configurations related to at least one of SSSG switching, and/or PDCCH skipping, and/or S Cell dormancy configured in the received RRC message. Table 1 shown above provides an example for the (RRC) table corresponding to the one or more items of information or configurations related to at least one of SSSG switching, and/or PDCCH skipping for a duration, and/or SCell dormancy. Taking the row index "1" for illustration, the row with the row index "1" defines the activation/enable of PDCCH skipping for a duration and the activation/enable of SSSG switching, where the PDCCH skipping duration is 6, and the SSSG ID is 1.

In some implementations, a UE may receive/decode/detect control information (e.g., DCI) including an n-bit (e.g., n=3) DCI field, the value m (e.g., m=011, or m=3) in the n-bit DCI field provides a row index (e.g., m or m+1) to a table corresponding to the one or more information or configurations related to at least one of SSSG switching, and/or PDCCH skipping (for a duration), and/or SCell dormancy configured in the received RRC message. Table 2 shown below provides an example for the (RRC) table corresponding to the one or more information or configurations related to at least one of SSSG switching, and/or PDCCH skipping for a duration, and/or SCell dormancy. Taking the row index "3" for illustration, the row with the row index "3" defines the deactivation/disabling of the PDCCH skipping (which also implies the configured PDCCH skipping duration may be ignored) and the activation/enabling of the SSSG switching, where the duration for SSSG switching (i.e., searchSpaceSwitchingTimer) is 8, and the SSSG ID is 1.

In some implementations, when the UE is indicated to activate/enable the PDCCH skipping and/or the SSG switching, the UE may perform the PDCCH skipping and/or the SSG switching on one or more or a group of serving cells. The serving cell may be a PCell and/or SCell(s). The UE may be configured with a group and/or a list of cells, e.g., by RRC configuration via at least one RRC message, for the PDCCH skipping and/or the SSSG switching. The group of serving cells may be a dormancy SCell group. The UE may determine to perform the PDCCH skipping and/or the SSG

TABLE 2

| index | activation/ deactivation of PDCCH skipping | activation/ deactivation of SSSG switching | PDCCH skipping duration (in unit of slot, and/or msec, symbol, subframe, and/or DRX cycle) | searchSpaceSwitchingTimer (in unit of slot, and/or msec, symbol, subframe, and/or DRX cycle) | SSSG ID |
|---|---|---|---|---|---|
| 0 | 1 | 1 | 3 | 3 | 2 |
| 1 | 1 | 1 | 6 | 3 | 0 |
| 2 | 0 | 1 | 4 | 6 | 0 |
| 3 | 0 | 1 | 2 | 8 | 1 |
| 4 | 1 | 0 | 5 | 8 | 1 |
| 5 | 1 | 0 | 6 | 10 | 2 |
| 6 | 0 | 0 | 4 | 10 | 2 |
| 7 | 0 | 0 | 1 | 12 | 2 |

In some implementations, a UE may receive/decode/detect a control information (e.g., DCI) including a n-bit (e.g., n=3) DCI field, the value m (e.g., m=001 or m=1) in the n-bit DCI field provides a row index (e.g., m or m+1) to a table corresponding to the one or more information or configurations related to at least one of SSSG switching, and/or PDCCH skipping (for a duration), and/or SCell dormancy configured in the received RRC message. Table 3 shown below provides an example for the (RRC) table corresponding to the one or more information or configurations related to at least one of SSSG switching, and/or PDCCH skipping for a duration, and/or SCell dormancy. Taking the row index "1" for illustration, the row with the row index "1" defines the activation/enable of the PDCCH skipping, where the PDCCH skipping duration is 6, the duration for the SSSG switching (i.e., searchSpaceSwitchingTimer) is 3, and the SSSG ID is 0. In this case, if the indicated SSSG ID is same as the SSSG ID that UE is currently monitoring, the UE may not change the SSSGID. In other words, the UE does not perform the SSSG switching if the SSSG ID indicated by the received control information and/or the (RRC) table is the same as the SSSG ID of the SSSG that UE is currently monitoring. Hence, the configured duration for SSSG switching (i.e., searchSpaceSwitchingTimer) may be ignored if the UE does not perform the SSSG switching, or not change the SSSG ID.

switching on a cell which has been configured for the PDCCH skipping and/or the SSSG switching.

In some implementations, when the UE is indicated to activate/enable the PDCCH skipping and/or the SSSG switching, the UE may only perform the PDCCH skipping and/or the SSSG switching when the UE is in DRX active time.

When a DCI indicating at least one of SSSG switching, PDCCH skipping (for a duration), and SCell dormancy is not received/decoded/detected successfully by a UE, e.g., on a specific CORESET/search space set, the UE behaviour on SSSG switching, PDCCH skipping for a duration, and SCell dormancy should be determined. Specifically, the search space sets may be configured to monitor PDCCH(s) for detection of a specific DCI format on the active DL BWP of the PCell or of the SpCell (e.g., according to a common search space). If a UE is provided with search space sets to monitor PDCCH(s) for detection of a specific DCI format in the active DL BWP of the PCell or of the SpCell and the UE does not detect the specific DCI format, the UE behaviour on SSSG switching, PDCCH skipping for a duration, and SCell dormancy should be determined.

In some implementations, the UE may not monitor the PDCCH for detecting the specific DCI format during DRX active time.

TABLE 3

| index | activation/ deactivation of PDCCH skipping | PDCCH skipping duration (in unit of slot, and/or msec, symbol, subframe, and/or DRX cycle) | searchSpaceSwitchingTimer (in unit of slot, and/or msec, symbol, subframe, and/or DRX cycle) | SSSG ID |
|---|---|---|---|---|
| 0 | 1 | 3 | 3 | 2 |
| 1 | 1 | 6 | 3 | 0 |
| 2 | 0 | 4 | 6 | 0 |
| 3 | 0 | 2 | 8 | 1 |
| 4 | 1 | 5 | 8 | 1 |
| 5 | 1 | 6 | 10 | 2 |
| 6 | 0 | 4 | 10 | 2 |
| 7 | 0 | 1 | 12 | 2 |

In some implementations, the UE may not monitor the PDCCH for detecting the DCI on all corresponding PDCCH monitoring occasions outside DRX active time prior to a next long DRX cycle.

In some implementations, the UE may not monitor the PDCCH for detecting the DCI during a measurement gap.

In some implementations, the UE may not monitor the PDCCH for detecting the DCI when the MAC entity monitors for a PDCCH transmission on the search space indicated by recoverySearchSpaceId of the SpCell identified by the C-RNTI while the ra-ResponseWindow is running.

In some implementations, the UE may not monitor the PDCCH for detecting the DCI when the UE is performing BWP switch.

In some implementations, if a UE is configured to monitor a DCI relating to at least one of SSSG switching, PDCCH skipping for a duration, and SCell dormancy in one or more search space sets and the UE does not receive/decode/detect the DCI successfully, the UE may perform SSSG switching, and/or PDCCH skipping (for a duration), and/or SCell dormancy operation according to one or more items as follows.

The UE may not perform the SSSG switching (i.e., the UE may not change/switch a (current) SSSG ID).

The UE may be configured a first timer (or a first period) via an RRC message. The first timer (or the first period) may, for example, start upon the UE start applying an SSSD ID and be used to indicate the (longest) period that the SSSG ID may be applied. When the UE does not receive/decode/detect the DCI, the UE may not change/switch a (current) SSSG ID until the first timer or the first period expires.

The UE may not change/switch the (current) SSSG ID after the first timer or the first period expires.

The UE may change to a default SSSG (configured via an RRC message) after the first timer or the first period expires.

The UE may not perform the PDCCH skipping (i.e., the UE may always monitor search space set, and/or the UE may not skip any PDCCH monitoring.)

The UE may not change the (current) PDCCH skipping duration.

The UE may be configured a second timer (or a second period) via an RRC message. The second timer (or the second period) may, for example, start upon the UE start applying a (current) PDCCH skipping duration and be used to indicate the (longest) period that the PDCCH skipping duration may be applied.

The second timer (or the second period) is not expected to be shorter (or less) than the (current) PDCCH skipping duration, and/or the PDCCH skipping duration indicated by the DCI.

The UE may always monitor search space set, and/or the UE may not skip any PDCCH monitoring after the second timer (or the second period) expires.

The UE may change to a default PDCCH skipping duration (configured via an RRC message) after the second timer (or the second period) expires.

The UE may not monitor any search space set after the second timer (or the second period) expires.

The first timer (or the first period) may be a same timer (or a same period) as the second timer (or the second period) in a received RRC message.

In some implementations, if a UE is configured to monitor DCI relating to at least one of SSSG switching, PDCCH skipping for a duration, and SCell dormancy in one or more search space set(s), and the UE does not receive/decode/detect the DCI successfully, the UE may determine whether to perform SSSG switching, and/or PDCCH skipping (for a duration), and/or SCell dormancy operation based on a specific configuration. For example, if the specific configuration indicates a first value (e.g., 0 or 1), the UE may need to perform SSSG switching, and/or PDCCH skipping (for a duration), and/or SCell dormancy operation once the UE does not receive/decode/detect the DCI successfully. On the other hand, if the configuration indicates a second value (e.g., 1 or 0) different from the first value, the UE may not need to perform SSSG switching, and/or PDCCH skipping (for a duration), and/or SCell dormancy operation once the UE does not receive/decode/detect the DCI successfully.

In some implementations, the DCI relating to at least one of SSSG switching, PDCCH skipping for a duration, and SCell dormancy may be DCI format 2_0, and/or DCI format 2_6 inside DRX active time, and/or DCI format 2_6 outside DRX active time.

In some implementations, the DCI relating to at least one of SSSG switching, PDCCH skipping for a duration, and SCell dormancy may be DCI format 1_1 without scheduling a PDSCH.

In some implementations, the UE may be configured with a specific timer (or a specific period) in an RRC message. The specific timer (or the specific period) may be used to indicate the (longest) period that one or more of parameters relating to the PDCCH skipping, and/or the SSSG switching, and/or the SCell dormancy may be applied.

In some implementations, a UE is configured to monitor a DCI format 2_0 relating to the SSSG switching, and the UE does not receive/decode/detect the DCI format 2_0 successfully. A default SSSG ID is configured in an RRC message. A timer relating to the SSSG switching is configured in an RRC message. In this case, the UE may switch the SSSG ID to the default SSSG ID until the timer relating to the SSSG switching expires.

In some implementations, a UE is configured to monitor, outside DRX active time, a DCI format 2_6 relating to the PDCCH skipping and the SCell dormancy in a DRX active time, and the UE does not receive/decode/detect the DCI format 2_6 successfully. In this case, the UE may not perform PDCCH skipping and SCell dormancy in the active time.

DCI indicating information relating to at least one of SSSG switching, PDCCH skipping (for a duration), and SCell dormancy may be configured without scheduling a PDSCH or a PUSCH.

In some implementations, if a UE receives/decodes/detects DCI (e.g., DCI format 1_1 and/or DCI format 0_1) indicating the PDCCH skipping (for a duration) without scheduling a PDSCH (or a PUSCH), and two PDCCH skipping durations are configured, the UE may perform the PDCCH skipping with a first PDCCH skipping duration of the two PDCCH skipping durations configured. If the UE receives/decodes/detects DCI (e.g., DCI format 1_1 and/or DCI format 0_1) indicating the PDCCH skipping (for a duration) with scheduling a PDSCH (or a PUSCH), and two PDCCH skipping durations are configured, the UE may perform the PDCCH skipping with a second PDCCH skipping duration of the two PDCCH skipping duration configured. The first PDCCH skipping duration may be, for example, longer than the second PDCCH skipping duration.

In some implementations, if a UE receives/decodes/detects DCI (e.g. DCI format 1_1 and/or DCI format 0_1) indicating at least one of the SSSG switching, the PDCCH skipping for a duration, and the SCell dormancy functionalities without scheduling a PDSCH (or a PUSCH), and is provided with a parameter relating to a HARQ-ACK codebook, the UE generates a HARQ-ACK information bit for the DCI (e.g. DCI format 1_1 and/or DCI format 0_1) indicating at least one of the SSSG switching, the PDCCH skipping for a duration, and the SCell dormancy functionalities, and the HARQ-ACK information bit value is ACK.

In some cases, if a UE receives/decodes/detects a DCI format 1_1 indicating the SSSG switching without scheduling a PDSCH, and is provided with a parameter relating to HARQ-ACK codebook (e.g., pdsch-HARQ-ACK-Codebook=dynamic or enhancedDynamic-r16), the UE may generate a HARQ-ACK information bit for the DCI format 1_1 indicating the SSSG switching and the HARQ-ACK information bit value is ACK.

In some cases, if a UE receives/decodes/detects a DCI format 1_1 indicating the SSSG switching and the PDCCH skipping for a duration without scheduling a PDSCH, and is provided with a parameter relating to a HARQ-ACK codebook (e.g., pdsch-HARQ-ACK-Codebook=dynamic or enhancedDynamic-r16), the UE may generate a HARQ-ACK information bit for the DCI format 1_1 and the HARQ-ACK information bit value is ACK.

Figure 7A:
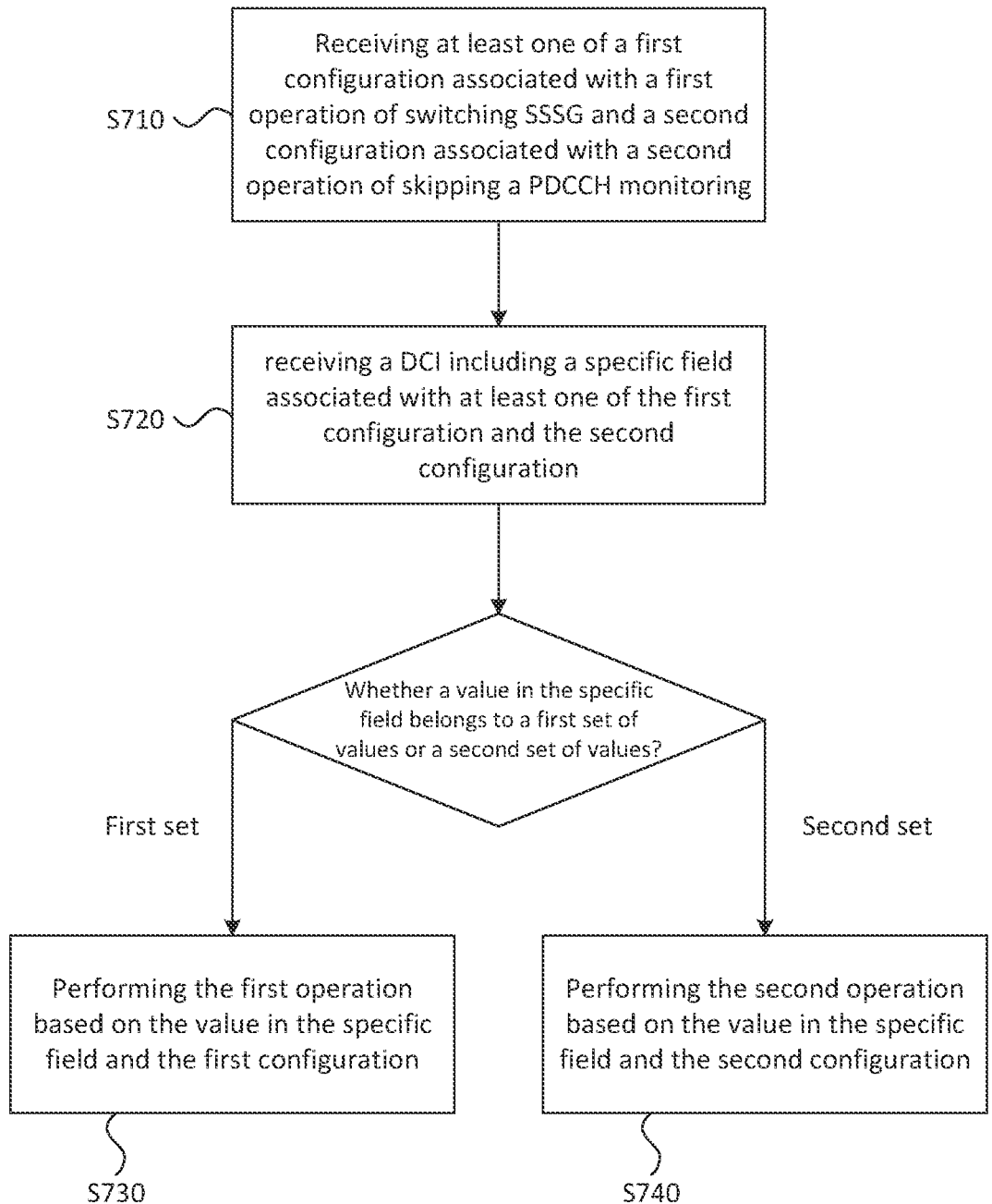
FIG. 7A and FIG. 7B are flowcharts each illustrating a method performed by a UE for supporting common design of PDCCH skipping and SSSG switching according to an example implementation of the present disclosure.
Figure 7B:
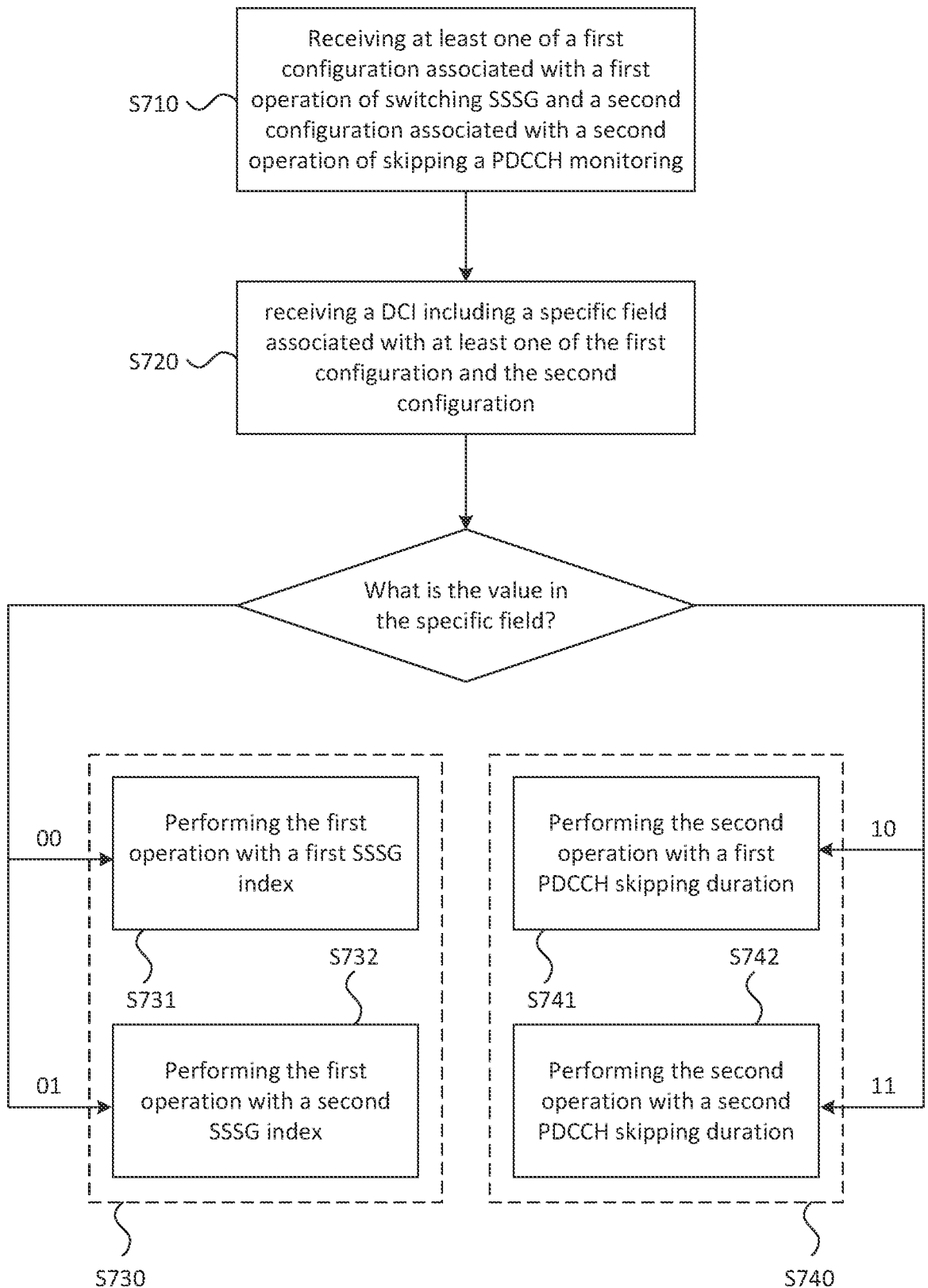

FIG. 7A and FIG. 7B are flowcharts each illustrating a method performed by a UE for supporting common design of PDCCH skipping and SSSG switching according to an example implementation of the present disclosure.

Referring to FIG. 7A and FIG. 7B, in action S710, the UE may receive at least one of a first configuration associated with a first operation of switching an SSSG and a second configuration associated with a second operation of skipping a monitoring of a PDCCH. It is noted that the operations (e.g., the first operation and the second operation) are not limited to be the SSSG switching and the PDCCH skipping. One skilled in the art may provide a different design of the operations (e.g., different types of operations and/or different numbers of the operations) based on similar concepts provided in the disclosure.

In some implementations, the first configuration may be parameter(s) related to SSSG switching and the second configuration may be parameter(s) related to PDCCH skipping. Specifically, the parameter(s) related to SSSG switching may include at least one of: one or more SSSG IDs, one or more numbers of SSSGs, one or more SSSG switching durations, one or more numbers of symbols, and one or more offsets; and the parameter(s) related to PDCCH skipping may include at least one of: one or more PDCCH skipping durations, one or more CORESET IDs, one or more SS IDs, one or more numbers of symbols, and one or more offsets. For example, the first configuration may include a first SSSG ID and a second SSSG ID. For example, the second configuration may include a first PDCCH skipping duration and a second PDCCH skipping duration.

In some implementations, the at least one of the first configuration associated with the first operation (e.g., SSSG switching) and the second configuration associated with the second operation (e.g., PDCCH skipping) may be a table relating to the first operation and the second operation. For example, the table may be Table 4 shown below.

TABLE 4

| index | PDCCH skipping duration | SSSG ID |
|---|---|---|
| 00 (0) | 3 | 2 |
| 01 (1) | 6 | 0 |
| 10 (2) | 4 | 0 |
| 11 (3) | 2 | 1 |

In some implementations, the at least one of the first configuration and the second configuration may be received via one or more RRC messages, but which is not limited herein to such messages.

Referring to FIG. 7A and FIG. 7B, in action S720, the UE may receive DCI including a specific field associated with at least one of the first configuration and the second configuration In some implementations, the DCI may be one of DCI format 0_1, DCI format 0_2, DCI format 1_1, and DCI format 1_2. In some embodiments, the UE may receive a DCI format 2_0 after receiving the first configuration and the second configuration via the RRC message.

In some implementations, the specific field may be a newly added field or a reused field in the received DCI. The field size is not limited in the disclosure. In some cases, the field size may be related to the received first and second configurations. For example, the first and the second configurations are provided by a table (e.g., Table 4) with 4 rows or entries, and the field size may be at least 2 for covering all entries of the table. For another example, the first and the second configurations are provided by a table with 8 rows or entries, and the field size may be at least 3 for covering all entries of the table. However, the disclosure is not limited in such a manner. In some other cases, the field size may not be related to the received first and second configurations.

Once the DCI is received and successfully decoded in the action S720, the UE may perform corresponding operation(s) according to corresponding configuration(s) based on a value of the specific field of the DCI.

In a case that the value of the specific field is one of a first set of values, action S730 is entered and as such the UE may perform the first operation based on the value of the specific field and the first configuration; and in a case that the value of the specific field is one of a second set of values, action S740 is entered and as such the UE may perform the second operation based on the value of the specific field and the second configuration.

For example, in a case that the value of the specific field is "00" or "01", action S730 is entered and as such the UE may perform SSSG switching (e.g., first 2 rows of Table 4) based on the value of the specific field and the first configuration (e.g., column "SSSG ID" of Table 4); and in a case that the value of the specific field is "10" or "11", action S740 is entered and as such the UE may perform the PDCCH skipping (e.g., last 2 rows of Table 4) based on the value of the specific field and the second configuration (e.g., column "PDCCH skipping duration" in Table 4).

In some implementations, the specific field may be composed of a first part and a second part. The first part includes first information indicating at least one of the first operation and the second operation, and the second part includes second information indicating parameter(s) of the at least one of the first operation and the second operation indicated in the first information. In a case that the first information indicates the first operation, the second information indicates parameter(s) related to SSSG switching; in a case that the first information indicates the second operation, the second information indicates parameter(s) related to PDCCH skipping; and in a case that the first information indicates both the first operation and the second operation, the second information indicates parameter(s) related to SSSG switching and parameter(s) related to PDCCH skipping.

In some implementations, a first sub-value (e.g., 0) in a first part (e.g., MSB) of the specific field (e.g., 2-bit field) indicates a first operation (e.g., SSSG switching), and a second sub-value (e.g., 1) in the first part of the specific field indicates a second operation (e.g., PDCCH skipping). As such, in a case that the SSSG switching is indicated by the first part of the specific field (i.e., value in the first part is the first sub-value), the first sub-value in a second part (e.g., LSB) of the specific field indicates a first SSSG ID, and the second sub-value in the second part of the specific field indicates a second SSSG ID; and in a case that the PDCCH skipping is indicated by the first part of the specific field (i.e., value in the first part is the second sub-value), the first sub-value in the second part of the specific field indicates a first PDCCH skipping duration, and the second sub-value in the second part of the specific field indicates a second PDCCH skipping duration.

Referring to FIG. 7B and Table 4, in a case that the value in the specific field is "00" or "01", the process goes left into the action S730, which means that the value is the first value (e.g., "00" or "01") or the first part (e.g., MSB) of the specific field is the first sub-value (e.g., "0"). Therefore, only the first two rows in Table 4 are useful. In a case that the value in the specific field is "00", action S731 is entered, which means that the second part (e.g., LSB) of the specific field is the first sub-value (e.g., "0"), and the UE may perform the first operation (e.g., SSSG switching) according to a first SSSG ID (e.g., 2) by referring to the first configuration (e.g., the column "SSSG ID" in Table 4). In a case that the value in the specific field is "01", action S732 is entered, which means that the second part (e.g., LSB) of the specific field is the second sub-value (e.g., "1"), and the UE may perform the first operation (e.g., SSSG switching) according to a second SSSG ID (e.g., 0) by referring to the first configuration (e.g., the column "SSSG ID" in Table 4).

On the other hand, in a case that the value in the specific field is "10" or "11", the process goes right into the action S740, which means that the value is the first value (e.g., "10" or "11") or the first part (e.g., MSB) of the specific field is the first sub-value (e.g., "1"). Therefore, only the last two rows in Table 4 are useful. In a case that the value in the specific field is "10", action S741 is entered, which means that the second part (e.g., LSB) of the specific field is the first sub-value (e.g., "0"), and the UE may perform the second operation (e.g., PDCCH skipping) according to a first PDCCH skipping duration (e.g., 4) by referring to the second configuration (e.g., the column "PDCCH skipping duration" in Table 4). In a case that the value in the specific field is "11", action S742 is entered, which means that the second part (e.g., LSB) of the specific field is the second sub-value (e.g., "1"), and the UE may perform the second operation (e.g., PDCCH skipping) according to a second PDCCH skipping duration (e.g., 2) by referring to the second configuration (e.g., the column "PDCCH skipping duration" in Table 4).

Accordingly, common design of two or more operations (e.g., SSSG switching, PDCCH skipping, etc.) may be supported by adopting the method introduced in the disclosure.

Figure 8:
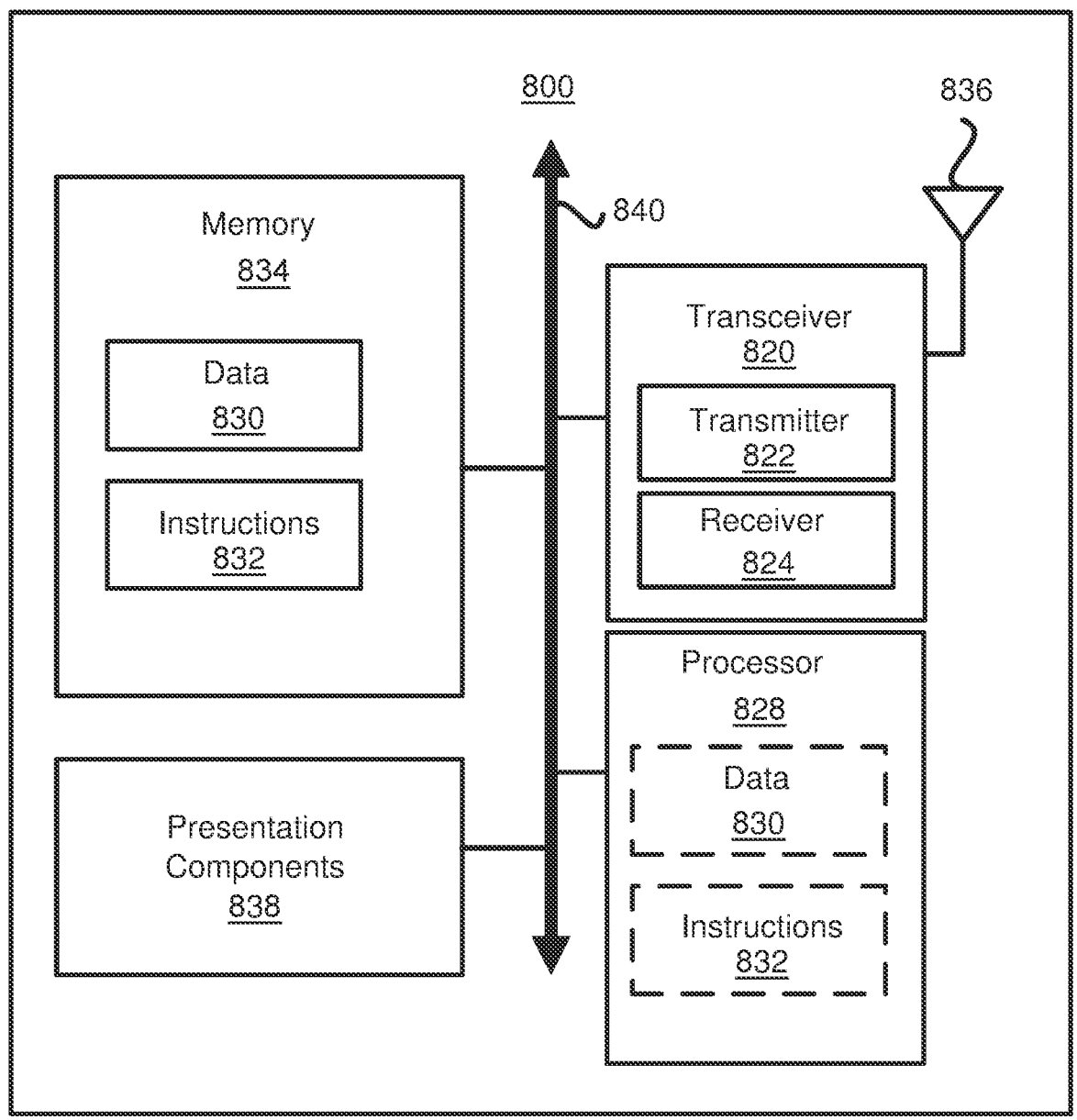
FIG. 8 is a block diagram illustrating a node for wireless communication according to an example implementation of the present disclosure.

FIG. 8 is a block diagram illustrating a node for wireless communication according to an example implementation of the present disclosure. As illustrated in FIG. 8, the node 800 may include a transceiver 820, a processor 828, a memory 834, one or more presentation components 838, and at least one antenna 836. The node 800 may also include an RF spectrum band module, a BS communications module, a network communications module, and a system communications management module, Input/Output (I/O) ports, I/O components, and a power supply (not explicitly illustrated in FIG. 8). Each of these components may be in communication with each other, directly or indirectly, over one or more buses 840. In some implementations, the node 800 may be a UE or a BS that performs various functions described herein, for example, with reference to FIGS. 1 through 7.

The transceiver 820 having a transmitter 822 (e.g., transmitting/transmission circuitry) and a receiver 824 (e.g., receiving/reception circuitry) may be configured to transmit and/or receive time and/or frequency resource partitioning information. In some implementations, the transceiver 820 may be configured to transmit in different types of subframes and slots, including, but not limited to, usable, non-usable and flexibly usable subframes and slot formats. The transceiver 820 may be configured to receive data and control channels.

The node 800 may include a variety of computer-readable media. Computer-readable media can be any available media that can be accessed by the node 800 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 802 may include computer storage media in the form of volatile and/or non-volatile memory. The memory 834 may be removable, non-removable, or a combination thereof. For example, the memory 834 may include solid-state memory, hard drives, optical-disc drives, etc. As illustrated in FIG. 8, the memory 834 may store computer-readable and/or computer-executable instructions 832 (e.g., software code(s) or computer-executable program(s)) that are configured to, when executed, cause the processor 828 to perform various functions described herein, for example, with reference to FIGS. 1 through 7. Alternatively, the instructions 832 may not be directly executable by the processor 828 but may be configured to cause the node 800 (e.g., when compiled and executed) to perform various functions described herein.

The processor 828 (e.g., having processing circuitry) may include an intelligent hardware device, a Central Processing Unit (CPU), a microcontroller, an ASIC, etc. The processor 828 may include memory. The processor 828 may process the data 830 and the instructions 832 received from the memory 834, and information through the transceiver 820, the baseband communications module, and/or the network communications module. The processor 828 may also process information to be sent to the transceiver 820 for transmission through the antenna 836, to the network communications module for transmission to a CN.

One or more presentation components 838 may present data indications to a person or other devices. Examples of presentation components 838 may include a display device, speaker, printing component, vibrating component, etc.

From the present disclosure, it is manifested that various techniques may be used for implementing the concepts described in the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE), the method comprising:
   receiving a first configuration associated with a first operation of switching a search space set group (SSSG) and a second configuration associated with a second operation of skipping a physical downlink control channel (PDCCH) monitoring;
   receiving downlink control information (DCI) comprising a specific field associated with the first configuration and the second configuration;
   performing the first operation based on a value in the specific field and the first configuration in a case that the value in the specific field is one of a first set of values; and
   performing the second operation based on the value in the specific field and the second configuration in a case that the value in the specific field is one of a second set of values,
   wherein a first part of the specific field comprises first information for determining whether to perform the first operation or the second operation, and a second part of the specific field comprises second information indicating an SSSG index or a PDCCH skipping duration.

2. The method of claim 1, wherein the specific field is a 2-bit field and the value in the specific field is one of 00, 01, 10, and 11.

3. The method of claim 2, wherein the first set of values comprises 00 and 01, and the second set of values comprises 10 and 11.

4. The method of claim 1, wherein a first sub-value in the first part of the specific field indicates the first operation and a second sub-value in the first part of the specific field indicates the second operation.

5. The method of claim 1, wherein:
   in a case that the first information indicates the first operation, a first sub-value in the second part of the specific field indicates a first SSSG index and a second sub-value in the second part of the specific field indicates a second SSSG index, and
   in a case that the first information indicates the second operation, the first sub-value in the second part of the specific field indicates a first PDCCH skipping duration and the second sub-value in the second part of the specific field indicates a second PDCCH skipping duration.

6. The method of claim 1, wherein the first part of the specific field comprises a most significant bit of the specific field, and the second part of the specific field comprises a least significant bit of the specific field.

7. The method of claim 1, wherein the DCI comprises one of a DCI format 0_1, a DCI format 0_2, a DCI format 1_1, and a DCI format 1_2.

8. The method of claim 1, further comprising:
   in a case that the value in the specific field is 00, performing the first operation with a first SSSG index;
   in a case that the value in the specific field is 01, performing the first operation with a second SSSG index;
   in a case that the value in the specific field is 10, performing the second operation with a first PDCCH skipping duration; and
   in a case that the value in the specific field is 11, performing the second operation with a second PDCCH skipping duration.

9. A User Equipment (UE), comprising:
   at least one processor; and
   at least one non-transitory computer-readable medium coupled to the at least one processor and storing one or more computer-executable instructions that, when executed by the at least one processor, cause the UE to:
   receive a first configuration associated with a first operation of switching a search space set group (SSSG) and a second configuration associated with a second operation of skipping a physical downlink control channel (PDCCH) monitoring;
   receive downlink control information (DCI) comprising a specific field associated with the first configuration and the second configuration;
   perform the first operation based on a value in the specific field and the first configuration in a case that the value in the specific field is one of a first set of values; and
   perform the second operation based on the value in the specific field and the second configuration in a case that the value in the specific field is one of a second set of values,
   wherein a first part of the specific field comprises first information for determining whether to perform the first operation or the second operation, and a second part of the specific field comprises second information indicating an SSSG index or a PDCCH skipping duration.

10. The UE of claim 9, wherein the specific field is a 2-bit field and the value in the specific field is one of 00, 01, 10, and 11.

11. The UE of claim 10, wherein the first set of values comprises 00 and 01, and the second set of values comprises 10 and 11.

12. The UE of claim 9, wherein a first sub-value in the first part of the specific field indicates the first operation and a second sub-value in the first part of the specific field indicates the second operation.

13. The UE of claim 9, wherein:
   in a case that the first information indicates the first operation, a first sub-value in the second part of the specific field indicates a first SSSG index and a second sub-value in the second part of the specific field indicates a second SSSG index, and in a case that the first information indicates the second operation, the first sub-value in the second part of the specific field indicates a first PDCCH skipping duration and the second sub-value in the second part of the specific field indicates a second PDCCH skipping duration.

14. The UE of claim 9, wherein the first part of the specific field comprises a most significant bit of the specific field, and the second part of the specific field comprises a least significant bit of the specific field.

15. The UE of claim 9, wherein the DCI comprises one of a DCI format 0_1, a DCI format 0_2, a DCI format 1_1, and a DCI format 1_2.

16. The UE of claim 9, wherein the one or more computer-executable instructions, when executed by the at least one processor, further cause the UE to:
- in a case that the value in the specific field is 00, perform the first operation with a first SSSG index;
- in a case that the value in the specific field is 01, perform the first operation with a second SSSG index;
- in a case that the value in the specific field is 10, perform the second operation with a first PDCCH skipping duration; and
- in a case that the value in the specific field is 11, perform the second operation with a second PDCCH skipping duration.

* * * * *